(12) United States Patent
Podgorny et al.

(10) Patent No.: US 10,394,804 B1
(45) Date of Patent: Aug. 27, 2019

(54) METHOD AND SYSTEM FOR INCREASING INTERNET TRAFFIC TO A QUESTION AND ANSWER CUSTOMER SUPPORT SYSTEM

(71) Applicant: Intuit Inc., Mountain View, CA (US)

(72) Inventors: Igor A. Podgorny, San Diego, CA (US); Matthew Cannon, San Diego, CA (US); Warren Bartolome, San Diego, CA (US); Nolan Richard Patterson, Escondido, CA (US); Bradly Stanton Feeley, La Mesa, CA (US)

(73) Assignee: Intuit Inc., Mountain View, CA (US)

( * ) Notice: Subject to any disclaimer, the term of this patent is extended or adjusted under 35 U.S.C. 154(b) by 840 days.

(21) Appl. No.: 14/878,709

(22) Filed: Oct. 8, 2015

(51) Int. Cl.
| | |
|---|---|
| *G06F 16/245* | (2019.01) |
| *G06Q 30/00* | (2012.01) |
| *G06F 16/9535* | (2019.01) |
| *G06F 16/2457* | (2019.01) |
| *G06F 16/958* | (2019.01) |
| *G06Q 10/10* | (2012.01) |

(52) U.S. Cl.
CPC ...... *G06F 16/245* (2019.01); *G06F 16/24578* (2019.01); *G06F 16/958* (2019.01); *G06F 16/9535* (2019.01); *G06Q 30/016* (2013.01); *G06Q 10/107* (2013.01)

(58) Field of Classification Search
CPC ........... G06F 17/30672; G06F 16/3338; G06F 16/245; G06F 16/958; G06Q 10/107
USPC ....................................................... 707/708
See application file for complete search history.

(56) References Cited

U.S. PATENT DOCUMENTS

| | | | |
|---|---|---|---|
| 5,471,382 | A | 11/1995 | Tallman et al. |
| 5,519,608 | A | 5/1996 | Kupiec |
| 6,147,975 | A | 11/2000 | Bowman-Amuah |
| 6,601,055 | B1 | 7/2003 | Roberts |
| 7,013,263 | B1 | 3/2006 | Isaka et al. |

(Continued)

FOREIGN PATENT DOCUMENTS

| | | |
|---|---|---|
| CN | 101520802 | 4/2009 |
| EP | 2159715 | 3/2010 |

(Continued)

OTHER PUBLICATIONS

The Scientific Marketer, "Uplift Modelling FAQ", article date of Sep. 27, 2007, retrieved from http://scientificmarketer.com/2007/09/uplift-modelling-faq.html (Year: 2007).

(Continued)

*Primary Examiner* — Shahid A Alam
(74) *Attorney, Agent, or Firm* — Hawley Troxell Ennis & Hawley LLP; Philip McKay

(57) ABSTRACT

A method and system increases Internet traffic to a question and answer customer support system, according to one embodiment. The method and system receive a question, and determine a search engine popularity or searchability of the question, according to one embodiment. If the search engine popularity or searchability of the question is less than a threshold, the question is provided to customer support personnel for reformation, according to one embodiment. The question and answer customer support personnel provide question reformation suggests to the customer support personnel, according to one embodiment.

30 Claims, 17 Drawing Sheets

(56) References Cited

U.S. PATENT DOCUMENTS

| | | | |
|---|---|---|---|
| 7,222,078 B2 | 5/2007 | Abelow | |
| 7,385,716 B1 | 6/2008 | Skaanning | |
| 7,594,176 B1 | 9/2009 | English | |
| 7,685,144 B1 | 3/2010 | Katragadda | |
| 7,974,860 B1 | 7/2011 | Travis | |
| 8,200,527 B1 | 6/2012 | Thompson et al. | |
| 8,311,792 B1 | 11/2012 | Podgorny et al. | |
| 8,341,167 B1 | 12/2012 | Podgorny et al. | |
| 8,484,228 B2 | 7/2013 | Bhattacharyya et al. | |
| 8,645,298 B2 | 2/2014 | Hennig et al. | |
| 8,660,849 B2 | 2/2014 | Gruber et al. | |
| 8,817,968 B1 | 8/2014 | Boutcher et al. | |
| 8,892,539 B2 | 11/2014 | Anand et al. | |
| 8,909,568 B1 | 12/2014 | Mann et al. | |
| 8,943,145 B1 | 1/2015 | Peters et al. | |
| 8,983,977 B2 * | 3/2015 | Ishikawa | G06F 17/30654 707/750 |
| 9,015,031 B2 | 4/2015 | Ferrucci et al. | |
| 9,060,062 B1 | 6/2015 | Madahar et al. | |
| 9,063,983 B1 | 6/2015 | Lee | |
| 9,247,066 B1 | 1/2016 | Stec et al. | |
| 9,336,211 B1 | 5/2016 | Bousquet et al. | |
| 9,336,269 B1 | 5/2016 | Smith et al. | |
| 9,342,608 B2 * | 5/2016 | Cook | G06N 5/02 |
| 9,460,191 B1 | 10/2016 | Gaucher et al. | |
| 9,471,883 B2 | 10/2016 | Chatterjee et al. | |
| 9,582,757 B1 | 2/2017 | Holmes et al. | |
| 9,633,309 B2 * | 4/2017 | Giffels | G06N 5/02 |
| 9,779,388 B1 | 10/2017 | Hansen et al. | |
| 9,887,887 B2 | 2/2018 | Hunter et al. | |
| 9,892,367 B2 | 2/2018 | Guo et al. | |
| 9,910,886 B2 * | 3/2018 | Adams, Jr. | G06F 17/30401 |
| 10,002,177 B1 | 6/2018 | McClintock et al. | |
| 10,083,213 B1 | 9/2018 | Podgorny et al. | |
| 10,134,050 B1 | 11/2018 | Hung et al. | |
| 10,147,037 B1 | 12/2018 | Podgorny et al. | |
| 10,162,734 B1 | 12/2018 | Podgorny et al. | |
| 2002/0111888 A1 | 8/2002 | Stanley et al. | |
| 2002/0111926 A1 | 8/2002 | Bebie | |
| 2002/0123983 A1 | 9/2002 | Riley et al. | |
| 2002/0169595 A1 | 11/2002 | Agichtein et al. | |
| 2003/0099924 A1 | 5/2003 | Tsuboi et al. | |
| 2003/0144873 A1 | 7/2003 | Keshel | |
| 2004/0024739 A1 | 2/2004 | Copperman et al. | |
| 2005/0114327 A1 | 5/2005 | Kumamoto et al. | |
| 2006/0085750 A1 | 4/2006 | Easton et al. | |
| 2006/0265232 A1 | 11/2006 | Katariya et al. | |
| 2007/0011131 A1 | 1/2007 | Delefevre | |
| 2007/0219863 A1 * | 9/2007 | Park | G06Q 10/10 705/14.11 |
| 2007/0259325 A1 | 11/2007 | Clapper | |
| 2008/0189197 A1 | 8/2008 | Allanson et al. | |
| 2008/0208610 A1 | 8/2008 | Thomas et al. | |
| 2008/0215541 A1 | 9/2008 | Li et al. | |
| 2008/0294637 A1 | 11/2008 | Liu | |
| 2009/0012926 A1 | 1/2009 | Ishikawa et al. | |
| 2009/0119575 A1 | 5/2009 | Velusamy | |
| 2009/0162824 A1 | 6/2009 | Heck | |
| 2009/0248659 A1 | 10/2009 | McCool et al. | |
| 2009/0253112 A1 | 10/2009 | Cao et al. | |
| 2009/0265340 A1 | 10/2009 | Barcklay et al. | |
| 2010/0068687 A1 | 3/2010 | Bertelsen | |
| 2010/0070554 A1 | 3/2010 | Richardson et al. | |
| 2010/0076998 A1 | 3/2010 | Podgorny et al. | |
| 2010/0088262 A1 | 4/2010 | Visel et al. | |
| 2010/0185630 A1 | 7/2010 | Cheng et al. | |
| 2010/0191686 A1 | 7/2010 | Wang et al. | |
| 2010/0203492 A1 | 8/2010 | Nibe et al. | |
| 2010/0205550 A1 | 8/2010 | Chen et al. | |
| 2010/0235361 A1 | 9/2010 | Chandran et al. | |
| 2010/0241971 A1 | 9/2010 | Zuber | |
| 2010/0318919 A1 | 12/2010 | Murphy et al. | |
| 2011/0055699 A1 | 3/2011 | Li et al. | |
| 2011/0125734 A1 | 5/2011 | Duboue et al. | |
| 2011/0202472 A1 | 8/2011 | Wan et al. | |
| 2011/0231347 A1 | 9/2011 | Xu et al. | |
| 2011/0264569 A1 | 10/2011 | Houseworth et al. | |
| 2011/0282892 A1 | 11/2011 | Castellani et al. | |
| 2012/0005148 A1 | 1/2012 | Horvitz et al. | |
| 2012/0005219 A1 | 1/2012 | Apacible et al. | |
| 2012/0022983 A1 | 1/2012 | Hughes et al. | |
| 2012/0084120 A1 | 4/2012 | Hirsch et al. | |
| 2012/0084185 A1 | 4/2012 | Ciaramitaro et al. | |
| 2012/0084293 A1 | 4/2012 | Brown et al. | |
| 2012/0095976 A1 | 4/2012 | Hebenthal et al. | |
| 2012/0130910 A1 | 5/2012 | Al-Alami | |
| 2012/0130978 A1 | 5/2012 | Li et al. | |
| 2012/0136764 A1 | 5/2012 | Miller et al. | |
| 2012/0166438 A1 | 6/2012 | Wu et al. | |
| 2012/0219142 A1 | 8/2012 | Gould | |
| 2012/0233191 A1 | 9/2012 | Ramanujam | |
| 2012/0331052 A1 | 12/2012 | Rathod | |
| 2013/0019286 A1 | 1/2013 | Barborak et al. | |
| 2013/0054497 A1 | 2/2013 | Garland et al. | |
| 2013/0066693 A1 | 3/2013 | Laird-Mcconnell et al. | |
| 2013/0073390 A1 | 3/2013 | Konig et al. | |
| 2013/0110823 A1 | 5/2013 | Su et al. | |
| 2013/0111323 A1 | 5/2013 | Taghaddos et al. | |
| 2013/0117677 A1 | 5/2013 | St Jacques, Jr. | |
| 2013/0282363 A1 | 10/2013 | Fan et al. | |
| 2013/0285855 A1 | 10/2013 | Dupray et al. | |
| 2013/0297553 A1 | 11/2013 | Bierner | |
| 2013/0304730 A1 | 11/2013 | Zhou | |
| 2013/0325992 A1 | 12/2013 | McGann et al. | |
| 2013/0339870 A1 | 12/2013 | Tandra Sishtla et al. | |
| 2014/0006012 A1 | 1/2014 | Zhou et al. | |
| 2014/0022328 A1 | 1/2014 | Gechter et al. | |
| 2014/0052606 A1 | 2/2014 | Vasudevan et al. | |
| 2014/0075004 A1 | 3/2014 | Van Dusen et al. | |
| 2014/0088944 A1 | 3/2014 | Natarajan et al. | |
| 2014/0114822 A1 | 4/2014 | Sharma et al. | |
| 2014/0119531 A1 | 5/2014 | Tuchman et al. | |
| 2014/0172883 A1 | 6/2014 | Clark et al. | |
| 2014/0189829 A1 | 7/2014 | McLachlan et al. | |
| 2014/0195613 A1 | 7/2014 | Ogilvie | |
| 2014/0201045 A1 | 7/2014 | Pai et al. | |
| 2014/0222669 A1 | 8/2014 | Novak et al. | |
| 2014/0280070 A1 | 9/2014 | George et al. | |
| 2014/0308648 A1 | 10/2014 | Jain | |
| 2014/0316856 A1 | 10/2014 | Williams et al. | |
| 2014/0324856 A1 | 10/2014 | Lahiani et al. | |
| 2014/0337257 A1 | 11/2014 | Chatterjee et al. | |
| 2014/0372980 A1 | 12/2014 | Verma et al. | |
| 2015/0052087 A1 | 2/2015 | Srinivasan et al. | |
| 2015/0058380 A1 | 2/2015 | Polonsky et al. | |
| 2015/0088608 A1 | 3/2015 | Cama et al. | |
| 2015/0095267 A1 | 4/2015 | Behere et al. | |
| 2015/0120718 A1 | 4/2015 | Luo et al. | |
| 2015/0127587 A1 | 5/2015 | Pinckney et al. | |
| 2015/0139415 A1 | 5/2015 | Skiba et al. | |
| 2015/0229531 A1 | 8/2015 | O'Sullivan et al. | |
| 2015/0254785 A1 | 9/2015 | Yang et al. | |
| 2015/0324805 A1 | 11/2015 | Skiba et al. | |
| 2015/0363481 A1 | 12/2015 | Haynes | |
| 2015/0371137 A1 | 12/2015 | Giffels et al. | |
| 2016/0048772 A1 | 2/2016 | Bruno et al. | |
| 2016/0055234 A1 | 2/2016 | Visotski et al. | |
| 2016/0062980 A1 | 3/2016 | Boguraev et al. | |
| 2016/0103833 A1 | 4/2016 | Sanders et al. | |
| 2016/0148222 A1 | 5/2016 | Davar et al. | |
| 2016/0148321 A1 | 5/2016 | Ciaramitaro et al. | |
| 2016/0180470 A1 | 6/2016 | Mascaro et al. | |
| 2016/0189029 A1 | 6/2016 | Giffels et al. | |
| 2016/0196497 A1 | 7/2016 | Allen et al. | |
| 2016/0217472 A1 | 7/2016 | Podgorny et al. | |
| 2016/0283491 A1 | 9/2016 | Lu et al. | |
| 2016/0306846 A1 | 10/2016 | Adams, Jr. et al. | |
| 2017/0024424 A1 | 1/2017 | Almohizea | |
| 2017/0032251 A1 | 2/2017 | Podgorny et al. | |
| 2017/0032468 A1 | 2/2017 | Wang et al. | |
| 2017/0124184 A1 | 5/2017 | Podgorny et al. | |
| 2017/0270159 A1 * | 9/2017 | Wang | G06F 17/30401 |
| 2017/0323233 A1 | 11/2017 | Bencke et al. | |
| 2018/0032890 A1 | 2/2018 | Podgorny et al. | |

(56) References Cited

U.S. PATENT DOCUMENTS

| | | |
|---|---|---|
| 2018/0089283 A1 | 3/2018 | Indyk et al. |
| 2018/0108092 A1 | 4/2018 | Goodyear et al. |
| 2018/0108093 A1 | 4/2018 | Podgorny et al. |
| 2018/0113935 A1 | 4/2018 | George et al. |
| 2019/0018692 A1 | 1/2019 | Indyk et al. |
| 2019/0018899 A1 | 1/2019 | Podgorny et al. |

FOREIGN PATENT DOCUMENTS

| | | |
|---|---|---|
| JP | 2014112316 | 6/2014 |
| WO | WO 2011/053830 | 5/2011 |

OTHER PUBLICATIONS

Zadeh, Z.; "Probabilistic Modeling in Community-Based Question Answering Services," Dalhousie University, Halifax, Nova Scotia; Feb. 2012.

Podgorny, et al. "Real Time Detection and Intervention of Poorly Phrased Questions," CHI EA '15, Proceedings of the 33rd Annual ACM Conference Extended Abstracts on Human Factors in Computing Systems, Apr. 18-23, 2015, Seoul, Republic of Korea, pp. 2205-2210.

Get Satisfaction [online]. Sprinklr, 2017 [retrieved on Nov. 22, 2017]. Retrieved from the Internet: <URL: https://getsatisfaction.com/corp>.

Bartolome et al., "Processing Unstructured Voice of Customer Feedback for Improving Content Rankings in Customer Support Systems," U.S. Appl. No. 15/094,653, filed Apr. 8, 2016.

Podgorny, et al., "Content Quality and User Ranking in TurboTax AnswerXchange," Proceedings of the European Conference on Social Media, University of Brighton UK, Jul. 10-11, 2014.

Dror, et al., "From Query to Question in One Click: Suggesting Synthetic Questions to Searchers," International World Wide Web Conferences Steering Committee, May 13, 2013, pp. 391-401.

* cited by examiner

| TYPE/FORMAT OF QUESTION | OCCURRENCE PERCENTAGE (%) | SATISFIED WITH ANSWER (%) |
|---|---|---|
| CLOSED-ENDED (Yes/No or Multiple choice) | 28.1 | 85.9 |
| WHO (Person) | 1.6 | 81.4 |
| WHAT (Thing or object) | 9.7 | 73.1 |
| WHERE (Position or place) | 8.6 | 70.2 |
| WHEN (Time or occasion) | 5.5 | 68.2 |
| ILL-FORMED (Search Query) | 28.7 | 66.8 |
| HOW (Way or form) | 21.6 | 66.4 |
| WHY (Reason or explanation) | 7.5 | 56.3 |

FIG. 1A

| MODEL ATTRIBUTE | WALD CHI-SQUARE |
|---|---|
| "CLOSED-ENDED" TYPE | (+) 339 |
| "WHY" TYPE | (−) 317 |
| REPORTING A PROBLEM | (−) 180 |
| "HOW" TYPE | (−) 105 |
| INTENT TO CALL/CHAT | (−) 104 |
| SUBJECT LENGTH | (+) 87 |
| SOFTWARE RELATED | (−) 77 |
| PERSONAL PRONOUN "YOU" | (−) 75 |
| INTENT TO PRINT TAX RETURN | (−) 66 |
| QUESTION MARK IN QUESTION | (+) 59 |

FIG. 1C

Ask a multiple-choice question (recommended):

Can, are, do, does, if, is, should, will...

Answer choices:
- ⦿ Yes or No
- ◯ Let me specify...

—or—

Ask an open-ended question:

Where, what, when, who, how...

FIG. 2A

QUESTION OPTIMIZER

Get better answers!
Can you rephrase "Why can't I print?"

BEST: Ask it as a multiple choice question

Can, are, do, does, if, is, should, will, which...

Be concise. You can add details next   15 more characters required

Answer choices:
This will help you get the answer you need,
but will not prevent people from adding detailed answers.
⦿ Yes or No
○ Let me specify...

GOOD: Ask it as an open-ended question

Where, what, when, who, how...

Be concise. You can add details next   15 more characters required

Skip | Submit optimized question

FIG. 2B

METHOD AND SYSTEM FOR INCREASING INTERNET TRAFFIC TO A QUESTION AND ANSWER CUSTOMER SUPPORT SYSTEM

BACKGROUND

Software applications and systems have become indispensable tools for helping consumers, i.e., users, perform a wide variety of tasks in their daily professional and personal lives. Currently, numerous types of desktop, web-based, and cloud-based software systems are available to help users perform a plethora of tasks ranging from basic computing system operations and word processing, to financial management, small business management, tax preparation, health tracking and healthcare management, as well as other personal and business endeavors, operations, and functions far too numerous to individually delineate here.

One major, if not determinative, factor in the utility, and ultimate commercial success, of a given software system of any type is the ability to implement and provide a customer support system through which a given user can obtain assistance and, in particular, get answers to questions that arise during the installation and operation of the software system. However, providing potentially millions of software system users with specialized advice and answers to their specific questions is a huge undertaking that can easily, and rapidly, become economically infeasible.

To address this problem, many providers of software systems implement or sponsor one or more question and answer based customer support systems. Typically, a question and answer based customer support system includes a hosted forum through which a user can direct their specific questions, typically in a text format, to a support community that often includes other users and/or professional support personal.

In many cases, once a user's specific question is answered by one or more members of the support community through the question and answer based customer support system, the user's specific question, and the answer to the specific question provided by the support community, is categorized and added to a customer support question and answer database associated with the question and answer based customer support system. In this way, subsequent users of the software system can access the user's specific question or topic, and find the answer to the user's question, via a search of the customer support question and answer database. As a result, a dynamic customer support question and answer database of categorized/indexed user questions and answers is made available to users of the software system through the question and answer based customer support system.

The development of customer support question and answer databases has numerous advantages including a self-help element whereby a searching user, i.e., a user accessing the resulting question and answer pair, can find an answer to their particular question by simply searching the customer support question and answer database for topics, questions, and answers related to their issue. In addition, if the answer to the user's specific question is not in the customer support question and answer database, the user can then become an asking user by submitting their question to the question and answer based customer support system, typically through the same website and/or user interface. Consequently, by using a question and answer based customer support system that includes a customer support question and answer database, potentially millions of user questions can be answered in an efficient and effective manner, and with little duplicative effort.

Some searching users are directed to the question and answer customer support system through Internet searches. Although the searching users may not be paying users of one or more services associated with the question and answer customer support system, the searching users who are directed to and who receive answers from the question and answer customer support system are exposed and/or introduced to a service provided by a service provider. A good experience with the service can result in additional interest in the service or in other services provided by the service provider. Thus, the question and answer customer support system provides a marketing advantage the service provider of the question and answer customer support system that is associated with one or more services.

Internet browsers and/or search engines regularly increase the likelihood of search hits for more popular Internet content and decrease the likelihood of search hits for less popular Internet content. The more frequently an Internet browser or search engine can provide its users with search results that they are likely to select, be satisfied with, and/or use, the more likely the Internet browser and/or search engine is to receive continued use, receive referrals from the user, and consequently receive additional revenue from advertisements. As a result, it can be in the Internet browser or search engine's best interest to match a user's search criteria with content that is viewed by many, that includes quality content, and that is likely to satisfy the searching user. In other words, the Internet browser and/or search engine has an interest in matching a user's search criteria with popular content.

If the question and answer customer support system fails to provide Internet search engines with popular and/or quality content, the question and answer customer support system can, over time, reduce its search engine visibility so that less traffic is directed from Internet searches to the question and answer customer support system.

What is needed is a method and system for increasing Internet traffic to a question and answer customer support system, to (for example) provide additional low-cost marketing to a service provider of the question and answer customer support system and to provide additional low-cost or free marketing to other services provided by the service provider who hosts the question and answer customer support system.

SUMMARY

Embodiments of the present disclosure provide improvements over traditional question and answer based customer support systems by increasing Internet traffic to a question and answer customer support system, to improve marketing for other services provided by the service provider that hosts the question and answer customer support system. The Inventors recognize that search engines monitor the popularity and quality of content and adjust search results to direct their users to relevant, popular, and quality content. For the search engines, providing relevant, popular, and quality content is advantageous to the search engine providers, so that users continue to use the search engines, so that users provide referrals for the search engines, and so that the search engine providers maintain and/or increase revenue generated from advertisements that are displayed on webpages alongside search results, according to one embodiment. Internet traffic that is directed to the question and answer customer support system strategically exposes Internet users to the question and answer customer support system and to other services offered by the service provider, to generate interest in the products/services offered by the service provider. The quality and quantity of exposure of Internet users to the question and answer customer support system and to other products/services, act as advertising/marketing for the products/services offered by the service provider. By marketing and/or advertising products/services to new or additional users that are directed through Internet traffic to the question and answer customer support system, the service provider increases the likelihood that non-paying potential customers will be converted to paying customers who subscribe to one or more services and/or who purchase one or more systems that are offered by the service provider, according to one embodiment.

The question and answer customer support system includes content (e.g., question and answer pairs), which affects search results generated by search engines. If the content of the question and answer customer support system has a relatively low popularity (e.g., quantified by a low number of views) and/or a relatively low quality (e.g., quantified as down votes by content reviewers), then the search engines decrease the likelihood (e.g., a searchability score) that the particular content will show up in Internet search results by users of the search engine. Conversely, when search engines determine that content within the question and answer customer support system is popular and is quality content, then the search engine increases the likelihood (e.g., the searchability score) that the particular content will show up in Internet search results by users of the search engine.

By identifying quality content, the service provider can increase product/service marketing and/or advertising by increasing the popularity of the identified quality content that is hosted by the question and answer customer support system, according to one embodiment. The disclosed system and method for increasing Internet traffic to the question and answer customer support system employs a number of techniques for increasing the popularity of quality content within the question and answer customer support system, according to various embodiments. The method and system for increasing Internet traffic to the question and answer customer support system includes receiving an original question, determining if the searchability and/or the popularity of the original question is below a threshold, directing the question to customer service personnel (or vice-versa), and providing the suggestions to the customer support for improving the searchability and/or popularity of the original question, according to one embodiment. The method and system for increasing Internet traffic to the question and answer customer support system also includes receiving a revised question (e.g., a revised version of the original question) from the customer support personnel, receiving an answer to the revised question from the customer support personnel, and publishing the revised question and the answer to the revised question, to enable search engines to match search criteria from users with the revised question and answer, according to one embodiment.

In one embodiment the searchability of the original question is determined based at least in part on one or more searchability factors which include, but are not limited to, a popularity of a question, a quality of a question, a question summary length, the inclusion of details in the question, a first token of the question summary length, and the like, according to one embodiment.

In one embodiment the question and answer customer support system duplicates the original question and pairs the answer of the revised question with the original question. In one embodiment, the question and answer customer support system directs the question submitting user to the original question with the answer for the revised question, so that the question submitting user is satisfied that the question and answer customer support system has answered the question submitting users question.

In one embodiment, the question and answer customer support system maintains a queue for questions that have yet to be answered, and/or maintains a queue for questions that would benefit from revision/reformation by customer support personnel to improve the popularity of the question, to improve the searchability of the original question, and to increase Internet traffic to the question and answer customer support database, according to one embodiment.

These embodiments, other embodiments, and the various terms used to describe the embodiments are disclosed in more detail below.

The disclosed method and system for increasing Internet traffic to a question and answer customer support system, provides for significant improvements to the technical fields of customer support, Internet marketing, search engines, software implementation, and user experience. In addition, using the disclosed method and system for increasing Internet traffic to a question and answer customer support system results in more efficient use of human and non-human resources, fewer processor cycles being utilized, reduced memory utilization, and less communications bandwidth being utilized to relay data to and from backend systems. These benefits can be achieved because the disclosed method can cause users to be less likely to request live customer support by increasing the search engine ranking/visibility/popularity of quality content so that fewer questions are submitted to the question and answer customer support system. As a result, implementing the disclosed method causes computing systems to be transformed into faster, more efficient, and more effective computing systems.

BRIEF DESCRIPTION OF THE DRAWINGS

FIG. 1A shows a table of results data obtained through analysis of actual questions submitted to a question and answer based customer support system indicating question types, the frequency of the question types as a percentage of questions asked, and ranking of the question types by up vote fraction;

FIG. 1C is a table of results data obtained through analysis of actual questions submitted to a question and answer based customer support system showing the Wald Chi-square statistics for the top subject attributes of a user vote analytics model;

FIG. 2A is an illustrative example of a first question transformation interface screen used to provide users format transformation/question reformation instructions that direct users in transforming improperly formatted questions into properly formatted closed-ended questions in accordance with one embodiment;

FIG. 2B is an illustrative example of a second question transformation interface screen used to provide users format transformation/question reformation instructions and using a question optimizer approach to direct users towards transforming improperly formatted questions into properly formatted questions in accordance with one embodiment;

Figure 1B:
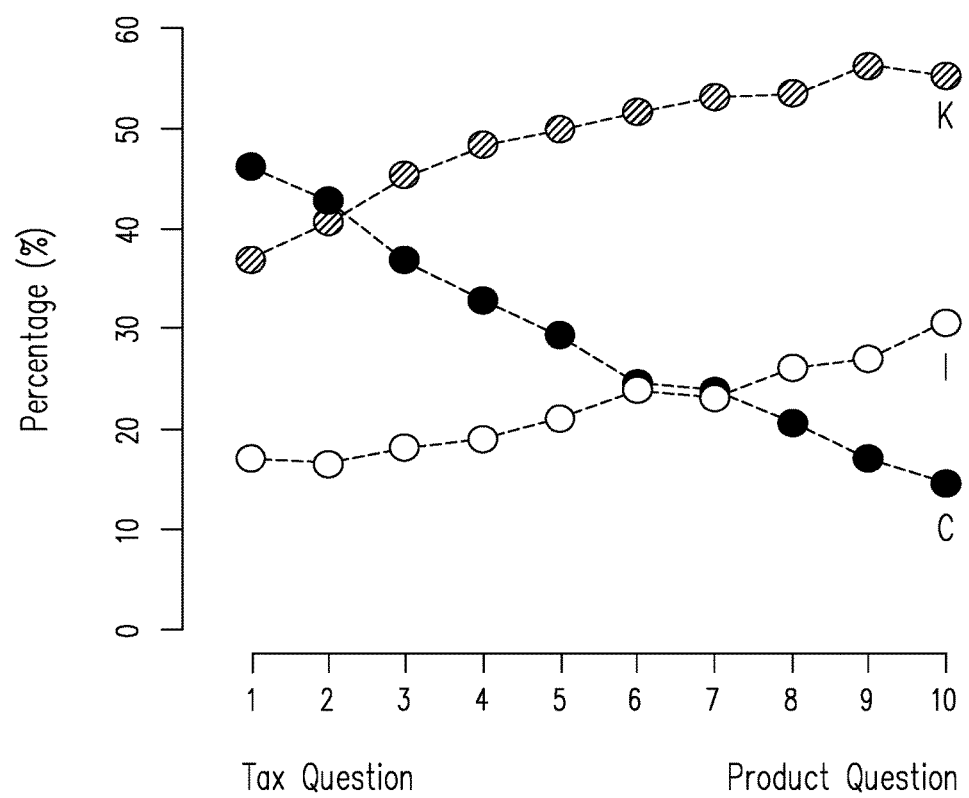
FIG. 1B is a graph of results data obtained through analysis of actual questions submitted to a question and answer based customer support system showing the discovered relationship between "subject matter questions," "product related questions," and the category of question asked.

Common reference numerals are used throughout the FIGS. and the detailed description to indicate like elements. One skilled in the art will readily recognize that the above FIGS. are examples and that other architectures, modes of operation, orders of operation, and elements/functions can be provided and implemented without departing from the characteristics and features of the invention, as set forth in the claims.

TERM DEFINITIONS

Herein, a software system can be, but is not limited to, any data management system implemented on a computing system, accessed through one or more servers, accessed through a network, accessed through a cloud, and/or provided through any system or by any means, as discussed herein, and/or as known in the art at the time of filing, and/or as developed after the time of filing, that gathers/obtains data, from one or more sources and/or has the capability to analyze at least part of the data.

As used herein, the term software system includes, but is not limited to the following: computing system implemented, and/or online, and/or web-based, personal and/or business tax preparation systems; computing system implemented, and/or online, and/or web-based, personal and/or business financial management systems, services, packages, programs, modules, or applications; computing system implemented, and/or online, and/or web-based, personal and/or business management systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filling or as developed later.

Specific examples of software systems include, but are not limited to the following: TurboTax™ available from Intuit, Inc. of Mountain View, Calif.; TurboTax Online™ available from Intuit, Inc. of Mountain View, Calif.; QuickBooks™, available from Intuit, Inc. of Mountain View, Calif.; QuickBooks Online™, available from Intuit, Inc. of Mountain View, Calif.; Mint™, available from Intuit, Inc. of Mountain View, Calif.; Mint Online™, available from Intuit, Inc. of Mountain View, Calif.; and/or various other software systems discussed herein, and/or known to those of skill in the art at the time of filing, and/or as developed after the time of filing.

As used herein, the terms "computing system," "computing device," and "computing entity," include, but are not limited to, the following: a server computing system; a workstation; a desktop computing system; a mobile computing system, including, but not limited to, smart phones, portable devices, and/or devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system" and "computing entity," can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes and/or operations as described herein.

Herein, the term "production environment" includes the various components, or assets, used to deploy, implement, access, and use, a given software system as that software system is intended to be used. In various embodiments, production environments include multiple computing systems and/or assets that are combined, communicatively coupled, virtually and/or physically connected, and/or associated with one another, to provide the production environment implementing the application.

As specific illustrative examples, the assets making up a given production environment can include, but are not limited to, the following: one or more computing environments used to implement at least part of the software system in the production environment such as a data center, a cloud computing environment, a dedicated hosting environment, and/or one or more other computing environments in which one or more assets used by the application in the production environment are implemented; one or more computing systems or computing entities used to implement at least part of the software system in the production environment; one or more virtual assets used to implement at least part of the software system in the production environment; one or more supervisory or control systems, such as hypervisors, or other monitoring and management systems used to monitor and control assets and/or components of the production environment; one or more communications channels for sending and receiving data used to implement at least part of the software system in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement at least part of the software system in the production environment; one or more databases used to store data in the production environment; one or more internal or external services used to implement at least part of the software system in the production environment; one or more backend systems, such as backend servers or other hardware used to process data and implement at least part of the software system in the production environment; one or more software modules/functions used to implement at least part of the software system in the production environment; and/or any other assets/components making up an actual production environment in which at least part of the software system is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate at least part of the software system.

In various embodiments, one or more cloud computing environments are used to create, and/or deploy, and/or operate at least part of the software system that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given software system or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing can be implemented as one or more virtual assets within one or more cloud or traditional computing environments.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user experience display" includes not only data entry and question submission user interfaces, but also other user experience features provided or displayed to the user such as, but not limited to the following: data entry fields; question quality indicators; images; backgrounds; avatars; highlighting mechanisms;

icons; and any other features that individually, or in combination, create a user experience, as discussed herein, and/or as known in the art at the time of filing, and/or as developed after the time of filing.

As used herein, the term "question quality indicator" includes any mechanism, means, or feature/function provided to indicate to a user a determined quality of a question being provided by the user. Specific examples of question quality indicators include, but are not limited to, meter displays; line displays; score displays; audio content; visual content; images; backgrounds; avatars; highlighting mechanisms; icons; and any other features that individually, or in combination, relay to a user a determined quality of a question being submitted.

As used herein, the term "question popularity indicator" includes any mechanism, means, or feature/function provided to indicate to a user a determined/estimated popularity of a question being provided by the user. Specific examples of question popularity indicators include, but are not limited to, meter displays; line displays; score displays; audio content; visual content; images; backgrounds; avatars; highlighting mechanisms; icons; and any other features that individually, or in combination, relay to a user a determined, estimated, or predicted quality of a question being submitted.

Herein, the term "party," "user," "user consumer," and "customer" are used interchangeably to denote any party and/or entity that interfaces with, and/or to whom information is provided by, the disclosed methods and systems described herein, and/or a person and/or entity that interfaces with, and/or to whom information is provided by, the disclosed methods and systems described herein, and/or a legal guardian of person and/or entity that interfaces with, and/or to whom information is provided by, the disclosed methods and systems described herein, and/or an authorized agent of any party and/or person and/or entity that interfaces with, and/or to whom information is provided by, the disclosed methods and systems described herein. For instance, in various embodiments, a user can be, but is not limited to, a person, a commercial entity, an application, a service, and/or a computing system.

As used herein, the term "asking user" is interchangeably used with "question submitting user", "question asker", "question submitter", and the like, and includes a user of a software system submitting submission content (e.g., a question) to a question and answer based customer support system.

As used herein, the term "searching user" includes a user of a software system submitting a search query to a customer support question and answer database associated with a question and answer based customer support system. An "answer recipient" includes one or both of the "asking user" and the "searching user", according to one embodiment.

As used herein, the term "responding user" can be interchangeably used with "customer support personnel" includes a user of a software system who submits a response to submission content for the question and answer based customer support system. In one embodiment, the term "response" is interchangeably used with the term "reply", and the term "responding user" is interchangeably used with the term(s) "replying user" and/or "answering user". In one embodiment, a "responding user", "replying user", and/or "answering user" is a user who submits an answer to submission content (e.g., a question) and/or one who submits a comment to submission content in the question and answer based customer support system. In one embodiment, the "responding user" and/or "customer support personnel" are users having experience, credentials, qualifications, vetting and/or authorization, of the service provider of the question and answer customer support system, to generate responses to questions, to revise/reform questions, and/or to revise/reform existing responses to questions.

As used herein, submission content includes a question summary and question details, and the term "submission content" is used interchangeably with the term "question". A question summary is a character limited summary or articulation of the question, and the question details are additional information about the user or the circumstances surrounding the question summary. As used herein, a "post" is used to refer to a publicized or published version of the submission content, and may include comments and/or answers submitted by users in response to publicizing, publishing, hosting, and/or posting the submission content. Although submission content and a post may include similar information, submission content references content that may have not been made publically available by a question and answer customer support system and posts have been made available for search, review, response, and comment by the public using, for example, one or more Internet search engines, according to one embodiment.

As used herein, the term "analytics model" or "analytical model" denotes one or more individual or combined algorithms or sets of equations that describe, determine, or predict characteristics of or the performance of a datum, a data set, multiple data sets, a computing system, and/or multiple computing systems. Analytics models or analytical models represent collections of measured and/or calculated behaviors of attributes, elements, or characteristics of data and/or computing systems. The term "predictive model" is used to denote a type or category of analytics or analytical model.

As used herein, the term "popularity" refers to a number of views received or estimated/predicted to be received by a question or a question-answer pair that are published by a question and answer customer support system, according to one embodiment. Popularity can be determined over one or more periods of time or can be determined from the time a question or question-answer pair are published. Popularity can be one factor (e.g., a searchability factor) of the searchability of a question or question-answer pair.

As used herein, the term "searchability" refers to the likelihood that content (e.g., Internet content such as published questions or question-answer pairs) should be, will be, or are matched to search criteria by a search engine, at least partially based on the attributes, relevance, quality, and/or popularity of the content. Searchability may be based on (for example) relatively objective criteria (e.g., searchabilty factors). "Searchability", as used herein, is more inclusive than just the relevance of the content because relevant content (e.g., word for word matching between search criteria and content) may be merely one factor or criteria used by search engines in determining and providing search results in response to receipt of search criteria. "Searchability score", as used herein, is a quantification of searchability. "Searchability score data", as used herein, refers to the data representation (e.g., in memory) of the searchability score, and other uses of "data" refer to the data representations of other information. "Searchability factors", as used herein, include attributes of questions and/or question-answer pairs, popularity of questions and/or question-answer pairs, and/or quality of questions and/or question-answer pairs.

As used herein, the term "visibility" is the prevalence with which content is provided as a search result by an Internet search engine. "Content" and "Internet content" can be used interchangeably, but content of the question and answer customer support system may not be published (e.g., may not be Internet-accessible), and Internet content includes content published by the question and answer customer support system (and includes other content published by other sources of Internet data). While it would make sense that Internet search engines should provide the most relevant Internet content, in response to receipt of search criteria, Internet search engines may at least partially rely on other information about Internet content when determining which Internet content to provide in search results. For example, Internet search engines may be configured to prioritize Internet content: based on relationships (e.g., financial or corporate relationships) between the search engine provider and particular content providers or content sources; based on perceived user-satisfaction with content; based on emerging trends; based on seasonal demands (e.g., tax season); based on historic popularity (e.g., number of views with a period of time or from the time content is published); and/or other criteria or information. Accordingly, as used herein, "visibility" or "Internet visibility" implies that factors (e.g., non-objective factors) other than relevance may be used by search engines when determining which content to provide in search results.

THEORY AND EMPIRICAL ANALYSIS

The embodiments disclosed herein were developed to incorporate theories and address relationships discovered through analysis of data collected from implementations/embodiments of a question and answer based customer support system implemented by Intuit™ Inc. of Mountain View, Calif. The specific question and answer based customer support system through which the data was collected was the TurboTax™ AnswerXchange™ ("AXC") question and answer based customer support system.

AXC is a social question and answer based customer support system providing support for TurboTax™ customers and also serving as a discussion forum in the area of US Federal and State taxation. AXC is also used to generate reusable content for TurboTax™ user searches, i.e., to create a customer support question and answer database for TurboTax™ users. In fact, only 1.5% of AXC users are asking users who actually submit questions, while the remaining searching users look for answers by searching a customer support question and answer database provided through AXC.

AXC includes a support community of customer support personnel. In one embodiment, questions submitted to AXC are answered by members of the support community of customer support personnel. In one embodiment, the customer support personnel include paid professional support personnel in the employ of Intuit™ and volunteer, often non-paid, experienced/expert users of the TurboTax™ software system. In one embodiment, the volunteer expert users of the TurboTax™ software system are identified and certified by Intuit™.

Questions submitted to AXC are formulated in a variety of ways and directed to various broad categories. As one example, some questions are "product related questions", e.g., questions related to pricing, installation, version choice, etc. of the TurboTax™ software system that often had little or no relation to the subject matter/endeavor supported by the TurboTax™ software system, i.e., tax preparation. On the other hand, some questions are "subject matter related," or substantive questions, directly related to the subject matter/endeavor supported by the TurboTax™ software system, i.e., Federal and State taxation and tax preparation.

As an example, the questions "What version of TurboTax™ should I use?" or "How do I install TurboTax™?" would be product related questions while the questions "Can I deduct my computer?" or "What is my adjusted gross income?" would be subject matter related questions. As discussed below, it is empirically determined that, in general, product related questions are best answered by paid support personnel in the employ of Intuit™ while subject matter related questions are often best answered by volunteer expert users.

Similar to other question and answer based customer support systems, AXC measures the quality of content, and answer content in particular, by collecting statistics of up and down votes directed to answer content provided by the asking users and searching users where an up vote indicates user satisfaction with the answer to the question and a down vote indicates user dissatisfaction with the answer to the question.

At the same time, the AXC questions are not ranked or judged based on quality of content beyond user satisfaction ratings, unless the question is determined as inappropriate and blocked from AXC. Therefore, user satisfaction with answer content in AXC typically would be derived from user votes to provide a metric for answer quality. For example, this approach is applied to predicting answer satisfaction in AXC based on the one or more attributes of the question and answer combined with one or more AXC users' attributes. On the other hand, as disclosed herein, an analysis of AXC vote statistics found that answer quality/satisfaction is largely predetermined by the question subject matter and/or question type/format, and that the users' satisfaction votes can be predicted with reasonable accuracy based on the attributes of the question alone. This finding provides a practical framework for "pro-active" detection of low-quality content at the question submission stage, i.e., before the question is even answered.

As noted above, questions submitted to AXC are formulated in a variety of ways and directed to various broad categories and subjects and in various question formats representing various question types. As one example, one user may ask "What version of TurboTax should I use?" Another user may ask "How do I install TurboTax?" Yet another user may ask "Can I deduct my computer?" It was determined that the optimal AXC design must be based on an empiric question taxonomy taking into account one or more of, the question category, the question format, the question grammar structure, the type of anticipated answer, asker type, and various other factors.

The Inventors began with general knowledge/open-ended question taxonomy. Specifically, the Inventors looked for "Wh-words" and "How" questions including interrogative pronouns such as "Who", "What", "When", "Where", "Why" and "How" used to compose general knowledge/open-ended category questions.

FIG. 1A is a table of results data obtained through the analysis of actual questions submitted to AXC. The table of FIG. 1A shows question types, also referred to herein as formats (column 101) of the 2014 AXC questions received, the frequency of the question types as a percentage of questions asked (column 102), and ranking of the question types/formats by up vote fraction (column 103) that are shown in FIG. 1A in descending order. It is noted that the sum of up vote and down vote fractions can be equal to or greater than 100% because some questions may belong to more than one type. As seen in FIG. 1A, when "Wh-words"

analysis was applied to the AXC question subjects with question summaries limited to 255 characters, 54.5% of the questions received fell into the general knowledge/open-ended category.

One of the Inventors' goals were to separate question types/formats by the observed statistics relating up and down votes associated with the answers provided to each question types/formats. The result of this analysis is shown in FIG. 1A. Referring to FIG. 1A, note that "Why" formatted questions can often indicate mildly negative sentiment and often imply a rhetorical question, e.g., "Why is this so difficult?" or "Why is this taking so much time?" The Inventors postulate that this explains the lowest up vote fraction of 56.3% being associated with the "Why" question type/format in the general knowledge/open-ended category, as shown in FIG. 1A.

Next, the Inventors selected closed-ended category questions from the 56.8% of AXC questions that did not belong to the general knowledge/open-ended category. Most of the closed-ended type/format questions in AXC were in the sub-category of "Yes/No" type/format questions. These "Yes/No" type/format questions typically start with an auxiliary verb such as "Do", "Can", "Be." As indicated by the name, the "Yes/No" type/format questions can be answered by a "Yes" or "No" answer. A specific illustrative example of a "Yes/No" question would be: "Can I deduct my computer?" with the possible answers "Yes, you can" or "No, you can't."

The second sub-category of closed-ended question type/format includes "Choice" type/format questions. "Choice" type/format questions generally start with an auxiliary verb as well, but also contain the conjunction "or." Consequently, "Choice" type/format questions usually result in a multiple choice answer embedded in the body of the question. A specific illustrative example of a "Choice" type/format question would be "Should I install X or Y version?" with the possible answers "You need to install Y," "You need to install X," "You need to install either X or Y," "You need to install neither X nor Y."

As seen in FIG. 1A, closed-ended type/format questions resulted in an impressive 85.9% up vote, i.e., 85.9% of users who submitted questions in the closed-ended format were satisfied with the answer provided. As seen in FIG. 1A, this was the highest satisfaction rating of all question types/formats. The high fraction of the up votes for the answers to the closed-ended type/format questions of in FIG. 1A is not surprising. Closed-ended type/format questions were typically long enough to provide sufficient context for answering, and were more likely to be subject matter related questions, as opposed to product related questions. As discussed below, subject matter related questions were channeled to volunteer expert users for answering and had a higher predicted likelihood of resulting in an up vote (see FIG. 1B discussed below).

Finally, if a question submitted to AXC was deemed to be neither a general knowledge/open-ended nor a closed-ended type/format question, the question was classified as being in the ill-formed question category by default. Most of the ill-formed category questions did not follow a grammatically correct question format either intentionally, e.g., search query type, or unintentionally, e.g., improper grammar, punctuation, etc., and were more difficult to answer. This, of course resulted in a higher probability of down vote from the users.

"How" and "Why" question types/formats were detectable with regular expressions analysis. Similarly "When", "Where" and "Who" question types/formats were detectable with regular expressions analysis but the analysis was slightly more involved as it typically required part-of-speech tagging to avoid confusion with relative adverbs and relative pronouns. However, as seen in FIG. 1A, these question types/formats were less common in AXC. More exotic question types/formats, such as "tag questions," "leading questions," and "embedded questions," were determined to be extremely rare in AXC and therefore were largely excluded from the Inventors' analysis.

FIG. 1B is a graph of results data obtained through analysis of actual questions submitted to AXC and showing the discovered relationship between: the percentage of up votes indicating user satisfaction with the answer provided (vertical axis), the category of question, e.g., "subject matter questions", or in the case of AXC, tax questions; "product related questions," or in the case of AXC, TurboTax™ product questions; and the type/format of the question asked. The horizontal axis in FIG. 1B was divided into Deciles 1 to 10, with Decile 1 corresponding to well-defined subject matter related questions, and Decile 10 corresponding to well-defined product related questions. Consequently, FIG. 1B displays the satisfaction percentages of general knowledge/open-ended (K), closed-ended (C), and ill-formed (I) question types versus content type. In the Inventors' analysis, only answered and voted upon questions were used to ensure the results reported/displayed in FIG. 1B that were consistent with the results reported/displayed in FIG. 1A.

FIG. 1C is a table of results data obtained through analysis of actual questions submitted to AXC showing the Wald Chi-square statistics for the top subject attributes of an AXC asking user vote analytics (e.g., predictive) model. In FIG. 1C, the (+) and (−) signs indicate positive or negative correlation between attribute and up vote. As seen in FIG. 1C, closed-ended, "Why" and "How" question types are three out of the four most important model attributes. The third attribute, "Reporting a problem," was found to correlate with "Why" and "How" types. As noted above, "Why" questions are often rhetorical and may remain "unanswerable" unless the user provides further details.

Once the data of FIG. 1A, FIG. 1B, and FIG. 1C was obtained, an initial goal of correlating the different question types/formats with the observed statistics relating up and down votes associated with the answers provided to each question type/format was attained. Then three additional goals were identified: transforming "Why" and "How" type/format questions into to closed-ended type/format questions; transforming "unanswerable" questions into "answerable" questions; and transforming ill-formed questions into "well formed" questions.

With respect to the goal of transforming "Why" and "How" type/format questions into to closed-ended type/format questions, it was determined that the biggest positive and negative impacts on AXC user satisfaction came from the answers to closed-ended and "How/Why" type/format questions, respectively. While it is difficult to alter the broad category/subject of the question, e.g., switching user attention from product related questions to subject matter related questions, it was determined that it may be possible to transform the question type/format from a low quality format question, with a low predicted user satisfaction with any answer to the question, to a high quality format question, with a higher predicted user satisfaction with any answer to the question. For example, asking the user to re-phrase/transform a "Why" type/format question into a closed-ended type/format question.

With respect to the goal of transforming "unanswerable" questions into "answerable" questions, it was determined that the unanswerable questions were often formed as a statement without specific details. The task therefore involved a re-phrasing/transformation process similar to the process for transforming "Why" and "How" type/format questions into to closed-ended type/format questions, and also asking the user for more information.

With respect to the goal of transforming ill-formed questions into "well formed" questions, it was determined that re-phrasing/transforming ill-formed questions, e.g., making the questions more detailed and adding proper punctuation, may result in better answers. See FIG. 1B.

Figure 2C:
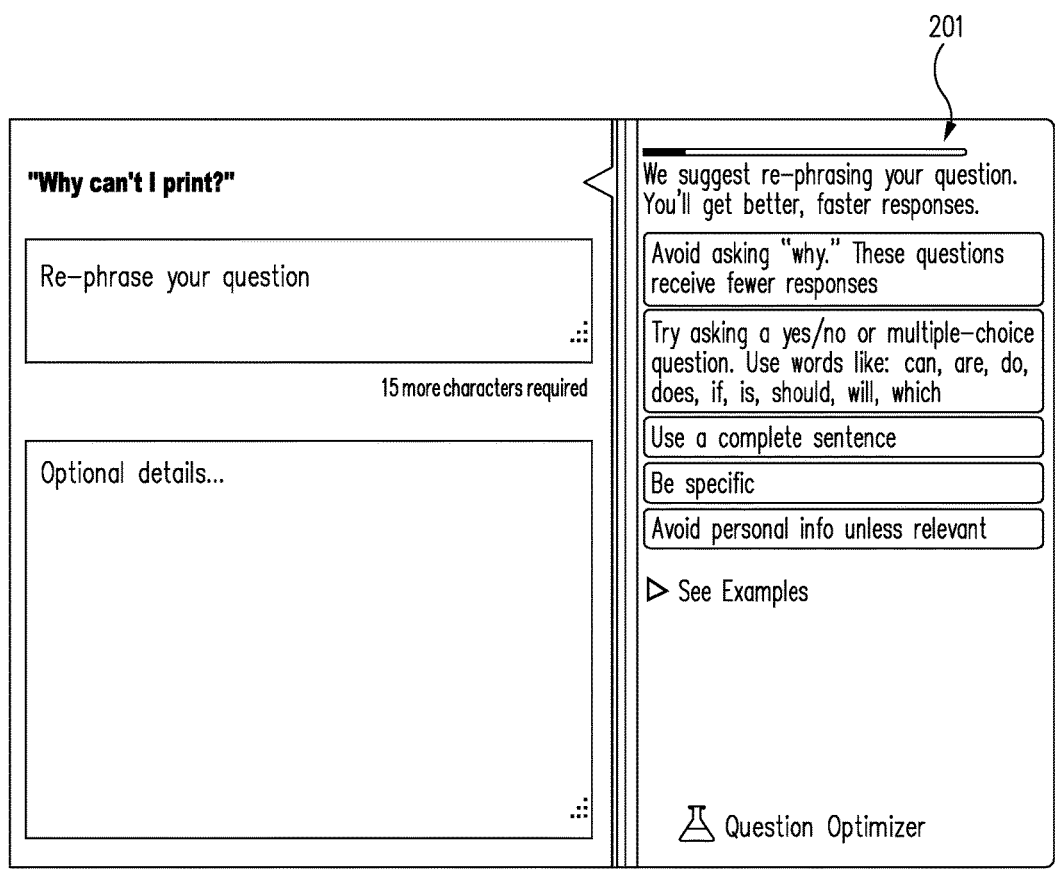
FIG. 2C is an illustrative example of a third question transformation interface screen used to provide users format transformation/question reformation instructions that direct users towards transforming improperly formatted questions into properly formatted questions and includes a visual question quality indicator, which provides a simple read of question-quality in accordance with one embodiment.

To address these three goals, the Inventors designed and tested three question transformation user interface screens used to provide format transformation/question reformation instructions that direct users towards transforming improperly formatted questions into properly formatted closed-ended questions. The three question transformation user interface screens are shown in FIGS. 2A, 2B, and 2C, and are discussed separately below.

The first experience prototype, and associated question transformation interface screen, the Inventors explored is shown in FIG. 2A. The experience prototype, and associated question transformation interface screen, of FIG. 2A used constraints to direct users towards asking closed-ended questions, and went as far as defaulting to Yes/No answer types/formats. The experience prototype, and associated question transformation interface screen, of FIG. 2A emphasized closed-ended question types/formats, which yield the highest rated answers (see FIG. 1A). This approach was ultimately determined to be less than ideal because of the front-loaded cognitive overhead it created that forced users to think about their question type/format before they had a chance to even phrase it, and which ultimately proved too burdensome on the user.

It was found survey-style answer choices helped phrasing. For open-ended general knowledge/open-ended questions, the Inventors prompted users by using the most highly rated question-types/formats in order of effectiveness (see FIG. 1A), i.e.: "Where" type/format questions, "What" type/format questions, "When" type/format questions, "Who" type/format questions, and "How" type/format questions. The Inventors left out "Why" type/format questions since, as discussed above, "Why" type/format questions often lead to "unanswerable" or rhetorical questions.

The second experience prototype, and associated question transformation interface screen, the Inventors explored is shown in FIG. 2B and is referred to as the question optimizer approach. One example of one embodiment of the question optimizer approach is the Question Optimizer™ used by Intuit Inc. of Mountain View, Calif. The question optimizer experience prototype, and associated question transformation interface screen, of FIG. 2B allows the user to formulate/phrase a question first, then the user is provided the format transformation/question reformation instructions advising the user on how to re-phrase/transform an improperly formatted question into a properly formatted question. The question optimizer experience prototype, and associated question transformation interface screen, of FIG. 2B thus provides contextual cues to the user to help the user re-phrase the question in such a way as to achieve the highest predicted level of satisfaction with any answer to that question using the data of FIG. 1A. Using the one embodiment of the question optimizer experience prototype, and associated question transformation interface screen, of FIG. 2B, users are asked to retype their question rather than edit the question. Research confirmed that this approach helps the users re-phrase the question more effectively.

One advantage of the question optimizer experience prototype, and associated question transformation interface screen, of FIG. 2B is that initial question data inputs from the user can be analyzed pro-actively in real time. In most cases, the question type/format could be reliably detected from the first few characters/tokens/text of the question entered, as the question was being entered. The intervention accomplished through the question optimizer experience prototype, and associated question transformation interface screen, of FIG. 2B may therefore come at the very early stages of question formulation, alleviating the user's concern about accidentally losing the question before it is submitted to/recorded in the AXC customer support question and answer database.

To test the question optimizer experience prototype, and associated question transformation interface screen, approach of FIG. 2B, the Inventors used 40 AXC "Why" type/format questions belonging to the bottom 10% question quality. The study participants were Intuit™ employees and Peet's Coffee & Tea™ customers who were shown the "Why" formatted questions inside the question optimizer experience prototype, and associated question transformation interface screen, of FIG. 2B. Samples of the original and re-phrased questions are shown in the following Examples 1, 2 and 3.

Example 1—Transformation from "Why" Type/Format Question to "What" Type/Format Question Original Question: I don't understand why I can't efile"
Re-Phrased Question: "What steps do I need to take to efile?"

Example 2—Transformation from "Why" Type/Format Question to Closed-Ended Type/Format Question Original Question: "why is my debit card being declined"
Re-Phrased Question: "My Debit card has been declined. Is there something I need to do to make it work?"

Example 3:—Transformation from "Why" Type/Format Question to "How" Type/Format Question Original Question: "why does the program freeze up when I try to download a state?"
Re-Phrased Question: "When I try to download a state the program is freezing. How can I fix it?"

The overall success rate of the question optimizer experience prototype, and associated question transformation interface screen, of FIG. 2B, i.e., the ability of the user to transform a "Why" type/format question to another, preferred, question type/format was 80%. What was especially encouraging is that some users were able to re-phrase "Why" type/format questions into closed-ended category questions (Example 2) while keeping the original intent of the question intact. This allows us to accomplish stated Goal 1, i.e., transforming "Why" and "How" type/formatted questions into to closed-ended category/formatted questions.

In addition, in most cases, the questions transformed/re-phrased using the question optimizer experience prototype, and associated question transformation interface screen, of FIG. 2B, became easier to understand and "answerable."

This allows us to accomplish stated Goal 2, i.e., transforming "unanswerable" questions into "answerable" questions.

In addition, re-phrasing/transforming using the question optimizer experience prototype, and associated question transformation interface screen, of FIG. 2B, typically resulted in better formed/formatted questions compared to the original question, including proper spelling, grammar structure, capitalization and punctuation. This allows us to accomplish stated Goal 3, i.e., transforming ill-formed questions into "well formed" questions.

In another experiment, the Inventors also found that users who were asked to retype the question using the question optimizer experience prototype, and associated question transformation interface screen, of FIG. 2B, generally did a better job in re-phrasing the original question. On the contrary, users who were asked to edit the original question typically kept the original question type intact.

The third experience prototype, and associated question transformation interface screen, the Inventors explored is shown in FIG. 2C which abandons the need to choose between general knowledge/open-ended or closed-ended type/format questions upfront. This allows the user to submit/document their question, and then with that task complete, move on to optimizing/transforming it. The experience prototype, and associated question transformation interface screen, of FIG. 2C also introduces the concept of a visual question quality indicator 201, which provides a simpler read of question-quality. Research indicates/demonstrates that users will be more interested in-rephrasing/transforming their question multiple times in a quest to get the meter "into the green."

The benefits of the data driven AXC question-asking experience, and the resulting method and system for proactively improving answer content in a question and answer based customer support system disclosed herein, are multi-fold. Better-formulated questions improve overall user experience and increase chances of receiving better answers contributing to the user satisfaction. More importantly, new questions will be both more relevant and higher quality for the 98.5% of customers who are searching users that leverage existing answers.

The data analysis discussed above provides a compelling argument for the idea that the quality of an answer can be determined by analyzing attributes of a question and that re-phrasing general knowledge/open-ended questions to closed-ended questions will result in higher quality question and answer based customer support system content, thus providing higher satisfaction for both the asking and searching user. These techniques can also be applied in the method and system for determining a level of popularity of submission content, according to one embodiment.

In addition to identifying attributes of questions that are more likely to result in up votes over down votes, the Inventors have identified attributes of submission content that determines the popularity of the submission content that is posted to the question and answer customer support system. As used herein, submission content includes a question summary and question details, and the term "submission content" is used interchangeably with the term "question". As used herein, a "post" is used to refer to a publicized or published version of the submission content, and may include comments and/or answers submitted by users in response to publicizing, publishing, hosting, and/or posting the submission content. As used herein, the popularity of the submission content refers to the relative ranking of views and/or of votes received by submission content. By determining/predicting and selectively manipulating the popularity of submission content, AXC contributes to the accomplishment of various business goals, such as, but not limited to, increasing conversions of potential customers to paying customers; decreasing live support costs; and attracting potential customers to products and services, e.g., TurboTax™, offered by the service provider. As described above, AXC may be configured to analyze submission content attributes (e.g., question attributes) to determine the likelihood of the submission content receiving an up vote or a down vote. However, just because the submission content is likely to receive an up vote, does not necessarily mean that the submission content is likely to be popular. Furthermore, just because the submission content is likely to receive a down vote, does not necessarily mean that the submission content is likely to be unpopular. By determining/predicting the popularity of submission content, AXC may be configured to automatically assist a user in altering submission content (e.g., modify the question-asking experience) so that the submission content is likely to be more popular or less popular, depending upon the impact that the submission content is predicted to have on the users of AXC.

There are at least three ways for users to view or be directed to AXC content, according to various embodiments. Authenticated (e.g., registered online with a username and/or password) users typically consume content when it is shown in response to the user search queries inside products that are associated with AXC, e.g., TurboTax Online™. Non-authenticated users working with TurboTax™ desktop versions typically see content shown at the AXC landing page (http (colon)//ttlc (dot) intuit (dot) com). Other users are directed to AXC content as a result of a search engine query, e.g., performed using Google and/or one or more other search engines. View and vote statistics for posts are recorded by all three channels and are subsequently used by popularity scoring algorithms (e.g., analytics and/or predictive models) when boosting content served by the AXC search engine or as part of the Google search engine optimization process, according to one embodiment. For example, TurboTax™ users who are dissatisfied with TurboTax™ prices may vote the related AXC content down, which may have the effect of reducing Google traffic to that particular AXC post, according to one embodiment. In short, user search patterns and user click patterns inside TurboTax™ may affect click patterns directed towards AXC content shown by Google and vice versa.

Because search engines, such as Google, track the views, votes, and relevance of submission content and/or posts, AXC can improve traffic received from search engines by revising/reforming questions that are submitted to and/or hosted by AXC.

Figure 3A:
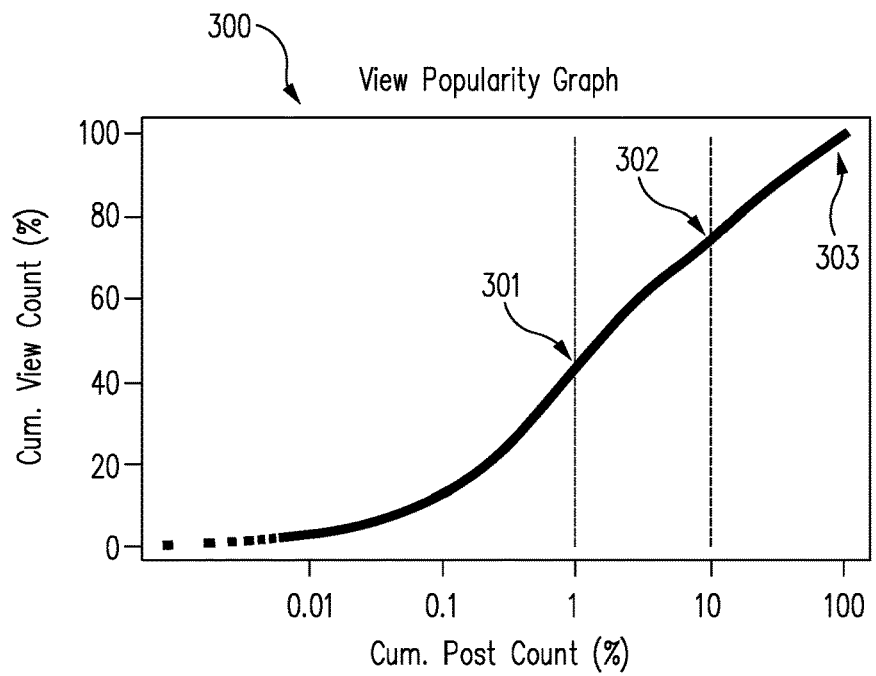
FIGS. 3A and 3B are illustrative examples of graphs related to view and vote characteristics of posts to in a question and answer customer support system in accordance with one embodiment.
Figure 3B:
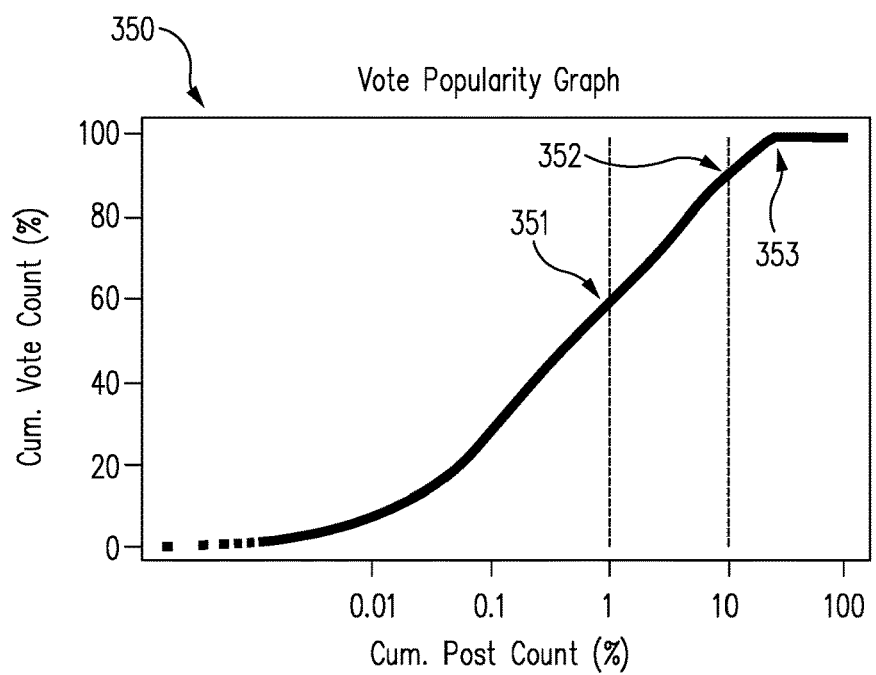

FIGS. 3A and 3B illustrate a view popularity graph 300 and a vote popularity graph 350 for cumulative post counts from AXC data created from Jan. 1, 2014 to Apr. 15, 2014, i.e., during the period of the highest user activity in 2014. The view popularity graph 300 includes cumulative counts of AXC views for the answered (62.6%) and unanswered (37.4%) posts created from Jan. 1, 2014 to Apr. 15, 2014. Overall, 556,000 posts were included in the analysis. As seen in the view popularity graph 300, graph coordinate 301 shows that 1% (i.e., the top 1%) of all AXC posts received approximately 40% of all AXC views in 2014. Graph coordinate 302 shows that 10% (i.e., the top 10%) of all AXC posts received approximately 70% of all views in 2014. The small percentages of AXC posts are referred to as the most popular AXC posts because of the concentration of views these posts received relative to all other available posts. Various classes of popularity can be defined, such as, the top 1%, the top 5%, the top 10%, the top 20%, etc., and the classes can be used to filter the content provided to AXC users to accomplish the previously noted business-related objectives. Referring back to view popularity graph 300, graph coordinate 303 shows that the bottom 10% of posts, ranked by the number of views, received just 0.5% of all AXC views in 2014, most of which originate from the asking users of the questions. The average number of views per post was 42.5 views, and any post with more than 64 views was in the top 10% of all AXC views in 2014.

The vote popularity graph 350 includes cumulative counts of AXC views for the answered (62.6%) and unanswered (37.4%) posts created from Jan. 1, 2014 to Apr. 15, 2014. Overall, 556,000 posts were included in the analysis. As seen in the vote popularity graph 350, graph coordinate 351 shows that 1% (i.e., the top 1%) of all AXC posts received approximately 60% of all AXC votes in 2014. Graph coordinate 352 shows that 10% (i.e., the top 10%) of all AXC posts received approximately 90% of all views in 2014. The small percentages of AXC posts are referred to as the most popular AXC posts because of the concentration of votes these posts received relative to all other available posts. Various classes of popularity can be defined, such as, the top 1%, the top 5%, the top 10%, the top 20%, etc., and the classes can be used to filter the content provided to AXC users to accomplish the previously noted business-related objectives. Referring back to vote popularity graph 350, graph coordinate 353 shows that approximately 74% (i.e., the bottom 74%) of posts, ranked by the number of votes, did not receive any AXC votes in 2014. In 2014, the average number of votes per post was 1.42.

The extreme or drastic concentration of views and votes on a limited quantity of total submissions/posts highlights or underscores the potential importance or influence that a popular high quality or a popular low-quality post (inclusive of an answer) can have on the reputation of AXC and the service provider. For example, if multiple question submissions are very likely to have low quality answers (based on the attributes of the questions), and these questions have attributes that make them highly popular, then searching users who are directed to low-quality answers/content may receive the misconception that the content of AXC is junk or is not relevant to them. Searching users who determined that the help system, e.g., for TurboTax™, is not helpful may decide to use live customer support, may decide not to use tax return preparation services associated with AXC, and/or may publicly express disgruntled opinions about AXC or its associated tax return preparation systems/services.

When predicting the expected popularity of submission content, it is helpful to switch from using regression techniques (e.g., by predicting an absolute number of views or rank of the post as measured by views) to a classification technique (e.g., by predicting whether submission content belongs to the 10% of the most popular posts by the number of views). In other words, instead of predicting one out of hundreds or thousands of possible ranks, using a binary or finite categorical judgment is computationally more efficient. The question then becomes "is this post in the top 10% or not", rather than "what is the rank of this post among all posts". Logistic regression is a particular form of regression, in which one predicts the probability that an item belongs in one of two categories (e.g., top 10% or bottom 90%). Because logistic regression output (e.g., popularity scores) range from 0 to 1, thresholds can be applied to the output as an empirically established float number to produce class predictions. Similar techniques can be used when predicting a likelihood of a user giving an up vote or a down vote to submission content. Because the requirements for a binary distinction are generally weaker than the requirements for predicting ranks using classification techniques, use of classification techniques typically results in better performance. In other words, using classification techniques is more computationally efficient than using regression techniques, so use of classification techniques typically results in better performance.

Figure 4:
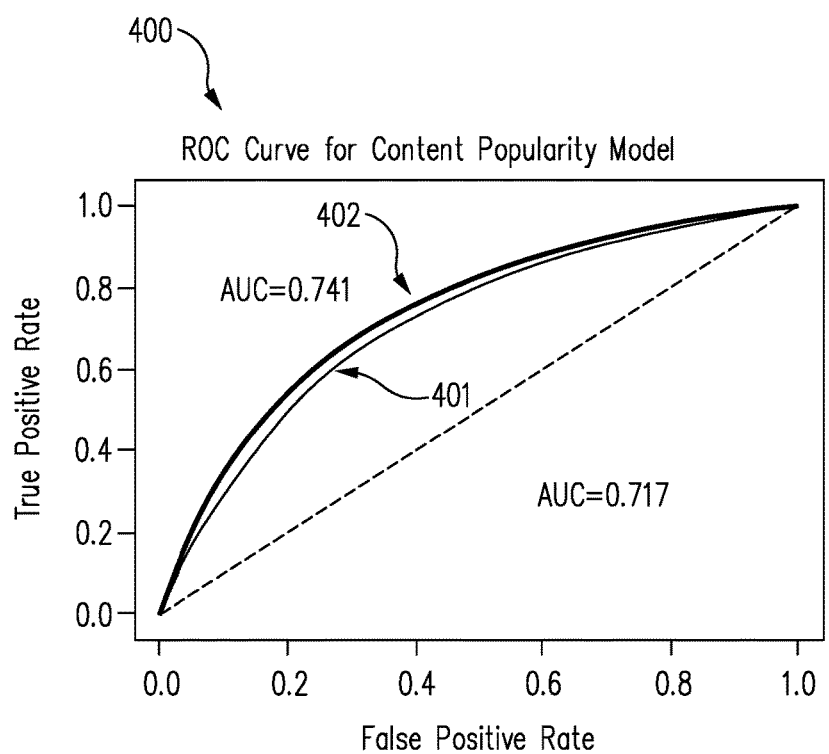
FIG. 4 is an illustrative example of a graph of operating characteristics for an analytics model that predicts the popularity of content in a question and answer customer support system in accordance with one embodiment.

FIG. 4 is a receiver operating characteristics ("ROC") curve 400 for a content popularity model and shows area under the curve ("AUC") values for the content popularity model. The ROC curve 400 includes a first curve 401 and a second curve 402. The first curve 401 represents the response of the content popularity model that is trained with the attributes of question summaries. The second curve 402 represents the response of the content popularity model that is trained with the attributes of question summaries and trained with the attributes of question details. The true positive rates of the second curve 402 are higher than most of the true positive rates of the first curve 401 for any given false positive rate. Thus, the second curve 402 indicates that the content popularity model that is trained with attributes of both question summaries and question details operates better than the content popularity model that operates with just the attributes of the question summaries. The AUC values also support this conclusion because the AUC value for the second curve 402 (AUC=0.741) is greater than the AUC value for the first curve 401 (AUC=0.717).

Some attributes of submission content or posts have a greater influence on the popularity of the submission content or posts than other attributes. The Inventors determined that the most determinative attribute of the content popularity models is question details. It was determined that the AXC posts that included question details received twice as many views (on average) than the posts without question details. The second most determinative attribute is the length of the question summary, measured in number of characters. Submission content or posts having longer question summaries are less likely to become popular and vice-versa. The third most determinative attribute is the first token of the question subject. The first tokens can be included as categorical variables or grouped and included as the binary "declarative" ("I", "my" and "we") or "interrogative" ("are", "does", "can", "is") attributes. Adding answer attributes to the model or accounting for seasonal patterns in user traffic do not result in noticeable improvements in the performance. In fact, the Lucene ranking algorithm that can be employed by AXC tends to boost new content.

The operation of ranking algorithms, such as the Lucene ranking algorithm, explains the inverse relationship between length of question summary and level of popularity for a post. Search results are more relevant if search query keywords are more frequent in a document or other searched text. A concept known as "tf-idf" weighting causes a shorter question summary with the same set of matching keywords to be a stronger match than a longer question summary having the same semantic meaning. A typical AXC search query is 2-3 terms long, which is much shorter than a typical AXC question summary, so a shorter question summary that includes the terms of the search query will be determined to be a stronger match than a longer question summary that includes less relevant terms in addition to the search terms. The effect of question details of posts is similar in that posts with question details receive an extra boost from the Lucene ranking algorithm and are therefore more likely to be shown at the top of the search results. The content shown in question details seems to play a minor role on the popularity of posts, and attention patterns in online forums have been shown to focus mostly on post titles, like the question summaries of submission content.

Figure 5:
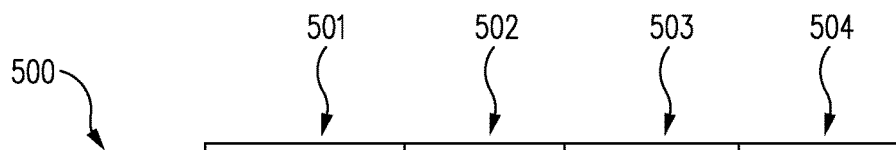
FIG. 5 is an illustrative example of a table of relationships between the attributes of question summaries and the popularity of submission content or posts in accordance with one embodiment.

As discussed above, the first token of the question subject of submission content is the third most determinative attribute in predicting or identifying the popularity of submission content. FIG. 5 includes a table 500 that illustrates relationships between question summary attributes and the popularity of a post, according to one embodiment. The table 500 includes the 20 most frequent first tokens of the question summaries for 556,000 posts. The natural language processing used for the analysis included (1) splitting "I'm" to "I" and "am", (2) merging "Turbo" and "Tax" into a single term, and (3) down-casing all characters. The percentages reported in the table 500 account for 75% of the posts. The most frequent token is "I", and is present in more than 25% of the posts. The next most frequent tokens are the "knowledge" question words "how" and "why". The popularity of the post is measured by both the average number of views and/or by the probability for the post to be in the top 10% of the most viewed and/or most voted-on posts. Both quantities are well correlated (Pearson's r=0.897, Spearman's p=0.957), with the only exception being "does" because "does" has the highest average number of views for any group. This appears to be a statistical aberration since two posts starting with "does" in the data set were in the top 10 most popular AXC posts in 2014. The table 500 includes five columns. The first column 501 represents the percentages of all posts. The second column 502 represents average views for a posts beginning with a particular token. The third column 503 represents percentages of posts in the top 10% of the most popular posts. The fourth column 504 represents the question answer rate. The third column 503 (percentages of posts in the top 10% of the most popular posts) and the fourth column 504 (answer rate) are also correlated (Pearson's r=0.660, Spearman's p=0.715). The answer rate dependence on the first token of the subject may reflect contributors' bias in selecting a question for answering, but the answer rate does not vary with the same magnitude as popularity.

As illustrated in table 500, the question subjects starting with "why" are almost half as popular as the average. This is good news from the AXC perspective because answers to "why" questions are more frequently voted down than other questions. With the exception of "why" and "when", which often indicate a rhetorical question type, the question summaries that begin with the interrogative pronouns "where", "what" and "how" ("knowledge" questions) and with the auxiliary verbs "are", "does", "can", "is" ("closed-ended" questions) are more likely than average to become popular. Conversely, "declarative" subjects starting with "I", "my" and "we" are less likely than average to become popular.

The tokens of table 500 have very little impact on algorithmic searches of the question summary, so the relationship between the tokens and the popularity (e.g., the third column 503) appears to be based on human preference. Search algorithms and search engines use stop words to improve the relevance of searches. 19 out of 20 tokens included in table 500 are typical stop words. The only exception is "TurboTax", which is one of the most frequent keywords in the AnswerXchange posts. Note that stop words (as any frequent terms in the document) are often discarded by the Lucene search engine. A typical AXC user spends 2-3 seconds reading a search result snippet and mostly focuses on the left top corner (a web marketing concept known as "Google golden triangle"). In this way, the user's impression of the first few words of the question summary (e.g., as shown in FIG. 3B) seems to play a critical role in the user's intent to read the entire post. One explanation of the results shown in table 500 is that AXC users are less interested in the content specific to somebody's experience (as revealed by the first person pronouns) and tend to skip search results having first person tokens. Psycholinguistic studies confirm that human attentional focus largely depends on the pronoun usage.

DETAILED DISCLOSURE

Embodiments will now be discussed with reference to the accompanying FIGS., which depict one or more exemplary embodiments. Embodiments may be implemented in many different forms and should not be construed as limited to the embodiments set forth herein, shown in the FIGS., and/or described below. Rather, these exemplary embodiments are provided to allow a complete disclosure that conveys the principles of the invention, as set forth in the claims, to those of skill in the art.

In one embodiment a software system is provided. As noted above, herein, the term software system includes, but is not limited to the following: computing system implemented, and/or online, and/or web-based, personal and/or business tax preparation systems; computing system implemented, and/or online, and/or web-based, personal and/or business financial management systems, services, packages, programs, modules, or applications; computing system implemented, and/or online, and/or web-based, personal and/or business management systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filling or as developed later.

Specific examples of software systems include, but are not limited to the following: TurboTax™ available from Intuit, Inc. of Mountain View, Calif.; TurboTax Online™ available from Intuit, Inc. of Mountain View, Calif.; QuickBooks™, available from Intuit, Inc. of Mountain View, Calif.; QuickBooks Online™, available from Intuit, Inc. of Mountain View, Calif.; Mint™, available from Intuit, Inc. of Mountain View, Calif.; Mint Online™, available from Intuit, Inc. of Mountain View, Calif.; and/or various other software systems discussed herein, and/or known to those of skill in the art at the time of filing, and/or as developed after the time of filing.

In one embodiment a question and answer based customer support system, e.g., a social question and answer (Q&A) system, is provided to support users of the software system.

In one embodiment, the question and answer based customer support system serves as a discussion forum in an area of endeavor related to the software system. As an illustrative example, in one embodiment, the question and answer based customer support system is provided to support a tax preparation software system and therefore the discussion forum is related to "federal and state taxation and tax preparation."

In one embodiment, users of the software system are provided the capability to submit questions regarding the installation, implementation, use and operation of the software system through the question and answer based customer support system.

In one embodiment, the question and answer based customer support system includes a support community of customer support personnel. In one embodiment, the customer support personnel include paid support personnel in the employ of the provider of the software system and non-paid volunteer expert users of the software system. In one embodiment, the volunteer expert users of the software system are identified and certified by the provider of the software system.

In one embodiment, through the question and answer based customer support system, users of the software system are provided the capability to submit questions to members of the support community of customer support personnel.

In one embodiment, questions submitted to the question and answer based customer support system can be related to very different broad categories, be of various question types, have varying predicted answer lengths, and be formatted in various different ways. For example, some questions submitted to the question and answer based customer support system are product related questions, e.g., questions related to pricing, installation, version choice, etc. for the software systems that often have little or no relation to the subject matter/job of the software system, i.e., the endeavor supported by the software system. On the other hand, some questions submitted to the question and answer based customer support system are subject matter related, or substantive, questions directly related to the subject matter/endeavor of the software system.

As an illustrative example, in the case of a tax preparation software system, the questions "What version of the tax preparation software system should I use?" or "How do I install the tax preparation software system?" would be product related questions while the questions "Can I deduct my computer?" or "What is my adjusted gross income?" would be subject matter related questions.

In general, product related questions are best answered by paid support personnel in the employ of the provider of the software system while subject matter related questions are often best answered by volunteer expert users of the software system. Consequently, in one embodiment, it is desirable to identify the broad category/subject matter of the questions, e.g., product related questions and subject matter related questions, and route the questions accordingly either to support personnel or volunteer expert users of the software system. As disclosed here, the user interface elements or a mobile device user interface are configured/customized to facilitate answering subject matter related questions by volunteer expert users of the software system, according to one embodiment.

In one embodiment, the question and answer based customer support system is used to generate reusable content for the question and answer based customer support system, e.g., the question and answer based customer support system is used to generate a customer support question and answer database. In one embodiment, the creation of the customer support question and answer database is the primary goal of the question and answer based customer support system. This is because it has been empirically demonstrated that only 1.5% of users of a typical question and answer based customer support system are asking users who submit their own questions, while the remaining 98.5% of users are searching users who look for answers by searching for similar topics and questions answered in the customer support question and answer database.

As discussed below in more detail, questions submitted to the question and answer based customer support system can also be structured/formatted in a variety of ways and these various question type/formats can vary significantly in quality, length, and effort needed to answer the question.

As a specific illustrative example, questions submitted to the question and answer based customer support system can be, but are not limited to: general knowledge/open-ended type questions, defined as "Who" type/format questions, "What" type/format questions, "When" type/format questions, "Where" type/format questions, "Why" type/format questions, and "How" type/format questions; rhetorical, or otherwise "unanswerable" questions; grammatically incorrect questions and/or queries; otherwise ill-formed questions; and/or closed-ended questions, capable of being answered with a simple "Yes" or "No", or via a multi-choice, or mapping. These question structures/formats are analyzed and used for facilitating the production of answer content for the customer support system, according to one embodiment.

In one embodiment, closed-ended category questions are identified/defined. The closed-ended formatted questions are placed in the sub-category of "Yes/No" type questions or multiple-choice questions. These "Yes/No" type questions typically start with an auxiliary verb such as "Do", "Can", "Be." As indicated by the name, the "Yes/No" type questions can be answered by a "Yes" or "No" answer. A specific illustrative example of a "Yes/No" question would be: "Can I deduct my computer?" with the possible answers "Yes, you can" or "No, you can't."

The second sub-category of closed-ended question format includes "Choice" type questions. "Choice" type questions generally start with an auxiliary verb as well, but also contain the conjunction "or." Consequently, "Choice" type questions usually result in a multiple choice answer embedded in the body of the question. A specific illustrative example of a "Choice" type question would be "Should I install X or Y version?" with the possible answers "You need to install Y," "You need to install X," "You need to install either X or Y," "You need to install neither X or Y."

As seen in FIG. 1A, closed-ended questions result in an impressive 85.9% up vote, i.e., 85.9% of users who submit questions in the closed-ended format are satisfied with the answer provided. As also seen in FIG. 1A this is the highest satisfaction rating of all question formats. Furthermore, closed-ended questions that are "Yes/No" type questions and/or "Choice" type questions are extraordinarily easy for customer support personnel to respond to. When customer support personnel received/review "Yes/No" type questions and/or "Choice" type questions, if the customer support personnel know the answer, they can respond from their mobile devices in a matter of minutes, if not seconds. Thus, routing close-ended questions that are "Yes/No" type questions and/or "Choice" type questions to the front of a question and answer queue or routing these questions ahead of more complex questions enables the question and answer based customer support system to leverage the available time and the mobile resources of voluntary customer support personnel in reducing/managing the size of a question and answer queue, according to one embodiment.

In one embodiment, if a question submitted to the question and answer based customer support system is deemed to be neither a general knowledge/open-ended nor a closed-ended format question, the question is classified as being in the ill-formed question category by default. Many of the ill-formed category questions do not follow a grammatically correct question format either intentionally, as in the case of a search query type, or unintentionally, e.g., wrong grammar, punctuation, etc.

"How" and "Why" question formats are detectable with format analysis instructions that implement regular expressions analysis. Similarly "When", "Where" and "Who" question formats are detectable with format analysis instructions that implement regular expressions analysis, however, the analysis is slightly more involved as it typically requires part-of-speech tagging to avoid confusion with relative adverbs and relative pronouns. As seen in FIG. 1A these question types are less common in question and answer based customer support systems. More exotic question types such as "tag questions," "leading questions," and "embedded questions" are extremely rare in question and answer based customer support systems, and therefore are largely excluded from analysis.

In one embodiment, user profile data indicating various user attributes is obtained. In one embodiment, the user profile data includes data obtained from other software systems used by the user and the resulting user profile data is shared with, or linked to, two or more software systems. In one embodiment, the user profile data is used to train the one or more analytics (e.g., predictive) models to determine the likelihood that a user will be more satisfied or less satisfied with a good answer when a predetermined stimulus or attribute is added to the answer.

As a specific illustrative example, in one embodiment, user historical data is obtained from the provided software system and/or associated question and answer based customer support system. In contrast, user profile data can be obtained from the provided software system and/or associated question and answer based customer support system, such as, for example, a tax preparation software system used by the user, and/or another software system and/or associated question and answer based customer support system, such as, for example, a personal financial management system used by the same user.

In one embodiment, questions submitted to the question and answer based customer support system by asking users, i.e., users submitting new questions, are meant to be answered by members of the support community of customer support personnel.

In various embodiments, the users of the software system enter question data through a question submission user interface provided through the question and answer based customer support system in the form of text data, audio data, symbolic data, and/or any other means, mechanism, process, or system, for entering question data as discussed herein, and/or as known in the art at the time of filing, and/or as developed after the time of filing.

As noted above, questions submitted to the question and answer based customer support system can be formulated in a variety of ways, directed to various broad categories/subjects, and be submitted in various question formats representing various question types.

In one embodiment, as the question data is being entered by a user, and/or is otherwise received, the question data is parsed and analyzed before providing the question data to any of the one or more support personnel. As noted above, in one embodiment, questions submitted to the question and answer based customer support system by asking users are meant to be answered by members of the support community of customer support personnel.

Process

Figure 6:
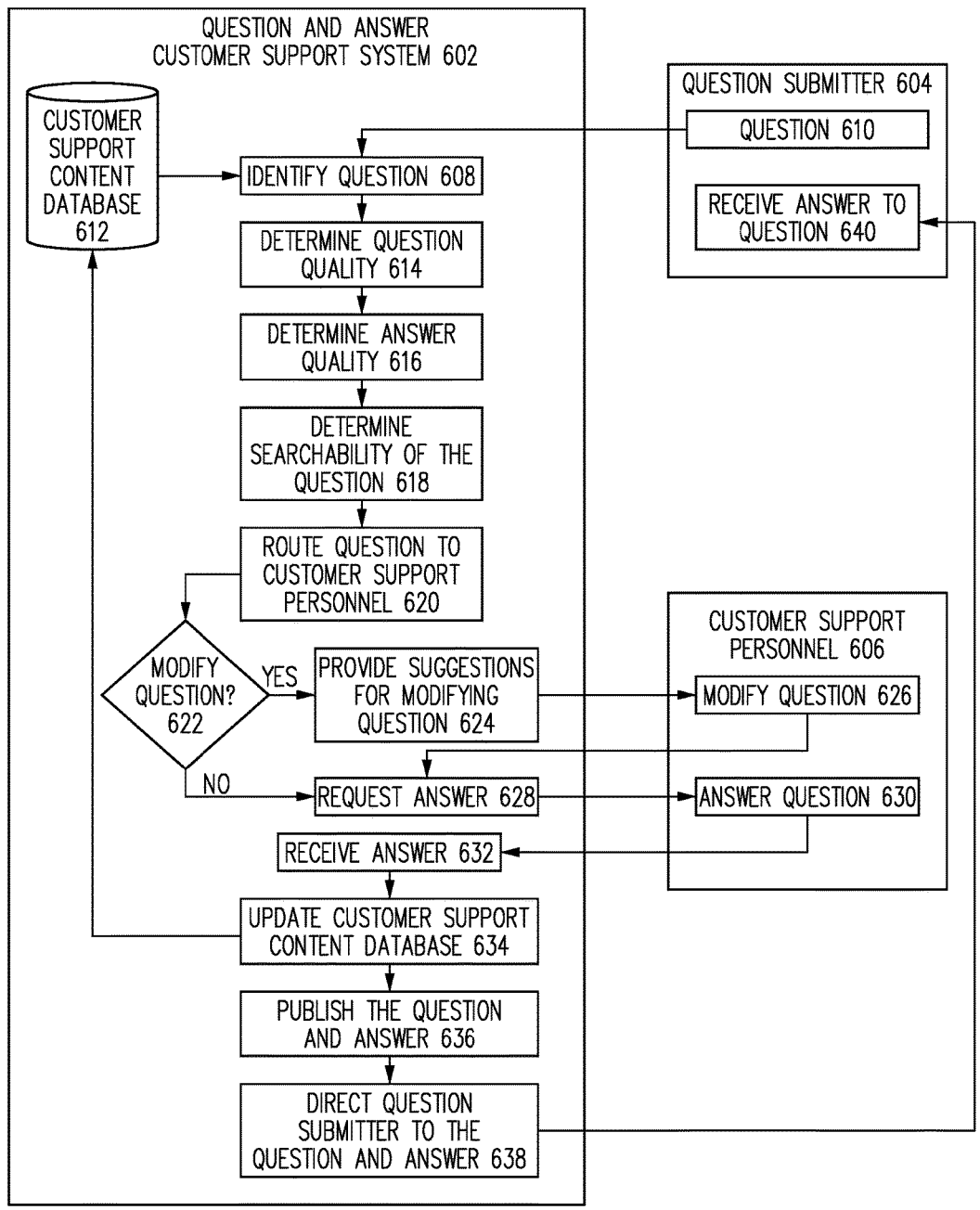
FIG. 6 is an illustrative example of a flow diagram representing one example of a generalized process for increasing Internet traffic to a question and answer customer support system.

FIG. 6 is a flow diagram representing one example of a process 600 for increasing Internet traffic to a question and answer customer support system, to improve the popularity of quality content within the question and answer customer support system, and/or to increase Internet-based marketing for products/services offered by a service provider for the question and answer customer support system, according to one embodiment. The process 600 includes operations that occur between a question and answer customer support system 602, a question submitter 604, and customer support personnel 606, to increase Internet traffic to the question and answer customer support system 602, according to one embodiment.

At operation 608, the question and answer customer support system 602 identifies a question, according to one embodiment. The question and answer customer support system 602 identifies the question by receiving a question 610 from the question submitter 604, according to one embodiment. The question and answer customer support system provides the question submitter 604 with one or more user experience displays, such as those illustrated in FIGS. 2A-2C and/or 10A-10B, to facilitate receipt of the question 610 by the question and answer customer support system 602, according to one embodiment. In one embodiment, the question and answer customer support system 602 identifies a question by receiving one or more questions from a customer support content database 612. The question and answer customer support system 602 is configured to iterate through some or all of the questions stored in the customer support content database 612 to moderate content, to provide quality assurance services, and/or to improve the content of the customer support content database 612, according to one embodiment. Operation 608 then proceeds to operation 614, according to one embodiment.

At operation 614, the question and answer customer support system 602 determines question quality, according to one embodiment. FIGS. 1-5, as previously described, provide various techniques for determining the quality of a question. The higher the quality of the question, the more likely the question submitter 604 will be satisfied with the answer to the question. The question and answer customer support system 602 is configured to apply one or more predictive models to a question to estimate the likelihood that the question will receive up votes or down votes by the question submitter 604 and by other question reviewers, according to one embodiment. In one embodiment, the question and answer customer support system 602 quantifies the quality of the questions based on attributes of the question, such as, but not limited to, whether the question is closed-ended, whether the first token (i.e., first word) of the question summary is "who" or "what", a length (e.g., character or word length) of the question summary, whether the question is substantive rather than product-related, whether the question is a statement or ill-formed question, and the like.

For questions that already have an answer and are hosted and/or published through the customer support content database 612, the question and answer customer support system 602 determines question quality by monitoring/evaluating a quantity and/or percentage of up votes and down votes received for the question (and its corresponding answer) from users of the question and answer customer support system 602, according to one embodiment. Operation 614 then proceeds to operation 616, according to one embodiment.

At operation 616, the question and answer customer support system 602 determines answer quality, according to one embodiment. For questions received from the question submitter 604, an answer may yet exist. However, for questions that are identified from the customer support content database 612, the question and answer customer support system 602 determines answer quality, at least partially based on up votes and down votes received from users of the question and answer customer support system 602, according to one embodiment. The question and answer customer support system 602 may benefit from determining answer quality for an answer, prior to modifying a question or and/or prior to modifying and answer. If, for example, a question and/or an answer are low quality, increasing the search engine popularity, visibility, and/or the searchability of a question may be counter-productive because increasing the search engine popularity, visibility, and/or searchability of the question may promote the dissemination of low-quality content from the question and answer customer support system 602, in addition to wasting computing resources and human resources on improving the Internet visibility of low-quality content. Thus, the question and answer customer support system 602 is configured to determine answer quality, as part of a filtering process, to enable the question and answer customer support system 602 to efficiently utilize available resources for improving the customer support content database 612 and/or for increasing Internet traffic to the question and answer customer support system 602, according to one embodiment. Operation 616 then proceeds to operation 618, according to one embodiment.

At operation 618, the question and answer customer support system 602 determines the searchability of the question, according to one embodiment. In one embodiment, the searchability of the question is at least partially related to the popularity of a question, because the more popular (e.g., likely to be viewed by user) a question is, the higher the likelihood is that one or more Internet search engines will match Internet search criteria with the question, according to one embodiment. Accordingly, improving the popularity (e.g., likelihood of being viewed by users) of a question having quality content, will lead to increased Internet traffic to the question and therefore to the question and answer customer support system 602, according to one embodiment.

The question and answer customer support system 602 employs one or more of a variety of techniques to determine the searchability and/or the popularity of a question, such as, but not limited to, estimating or determining a quantity of views/popularity for a question, determining the quality of a question, determining a summary length of the question, determining whether a question includes details, determining a first token/word of a question summary, according to one embodiment. In one embodiment, the attributes of a question are searchability factors for the question that determine the likelihood of an Internet search engine to match search criteria with a submitted question, according to one embodiment.

In one embodiment, the searchability of a question or popularity of a question is represented by a searchability score. The searchability score is an accumulation of numerical assignments applied to question attributes (i.e., searchability factors). If the sum of the numerical assignments fails to exceed a threshold (such as a searchability threshold), then the question is identified or determined to be inefficient at directing traffic, through Internet search engines, to the question and answer customer support system 602, according to one embodiment. Operation 618 then proceeds to operation 620, according to one embodiment. The process 700, described below, provides additional embodiments of determining the searchability and/or popularity of a question.

At operation 620, the question and answer customer support system 602 routes the question to customer support personnel 606, according to one embodiment. The customer support personnel 606 includes one or more paid and/or volunteer personnel who are qualified, certified, and/or authorized by the service provider of the question and answer customer support system 602, to reform (e.g., revise and/or modify and/or improve) one or more questions and/or answers that are received, stored, and/or maintained by the customer support content database 612, according to one embodiment. Operation 620 proceeds to operation 622, according to one embodiment.

At operation 622, the question and answer customer support system 602 determines whether to modify the question identified in operation 608, according to one embodiment. The question and answer customer support system 602 determines whether to modify a question by comparing the searchability of a question, in terms of a searchability score, to one or more thresholds, according to one embodiment. For example, the question and answer customer support system 602 proceeds to have a question modified if the searchability score of a question is below a threshold and/or below a numerical representation of a threshold, and/or if one or more searchability factors have characteristics that are indicative of an unpopular or unlikely to be popular question, according to one embodiment. As an example, the question and answer customer support system 602 is configured to cause a question to be modified if a question is lacking details, if a question summary length is greater than a predetermined threshold or number of characters (e.g., 30 characters), and/or if a first token of the question summary is "how", "why", "I", or similar tokens that are associated with less popular questions, according to one embodiment. If the question and answer customer support system 602 proceeds with having the question modified, operation 622 proceeds to operation 624, according to one embodiment. If the question and answer customer support system 602 proceeds to not have the question modified, operation 622 proceeds to operation 628, according to one embodiment.

At operation 624, the question and answer customer support system 602 provides suggestions for modifying the question, according to one embodiment. The question and answer customer support system 602 provides suggestions to the customer support personnel 606 for modifying the question, according to one embodiment. The suggestions are based on one or more searchability factors (e.g., question attributes), according to one embodiment.

At operation 626, the customer support personnel 606 reform the question, according to one embodiment. The customer support personnel 606 reforms (e.g., revises and/or modifies) the question to improve the popularity of the question so that Internet search engines are more likely to increase the frequency and the ranking with which the question (with its corresponding answer) are provided in search results that are responsive to search criteria submitted to the search engine by Internet users, according to one embodiment. When the customer support personnel 606 reforms the question, the question and answer customer support system receives the reformed question, according to one embodiment. Operation 626 proceeds to operation 628, according to one embodiment.

At operation 628, the question and answer customer support system 602 requests an answer, according to one embodiment. The question and answer customer support system 602 requests an answer from the customer support personnel 606, according to one embodiment. The question and answer customer support system 602 requests an answer to the original question identified at operation 608, or requests an answer to the reformed question received from the customer support personnel 606, according to one embodiment. The received answer can be applied to the original question and/or to the reformed question, according to one embodiment. Operation 620 proceeds to operation 630, in one embodiment.

At operation 630, the customer support personnel 606 answers the question, according to one embodiment. The customer support personnel 606 answers the reformed question if the customer support personnel 606 reforms the original question, otherwise, the customer support personnel 606 answers the original question, according to one embodiment. Operation 630 proceeds to operation 632, according to one embodiment.

At operation 632, the question and answer customer support system 602 receives the answer, according to one embodiment. The question and answer customer support system 602 receives the answer from the customer support personnel 606, according to one embodiment. Operation 632 proceeds to operation 634, according to one embodiment.

At operation 634, the question and answer customer support system 602 updates the customer support content database 612, according to one embodiment. The question and answer customer support system 602 updates the customer support content database 612 by uploading the original question paired with the answer received from the customer support personnel, according to one embodiment. In one embodiment, the question and answer customer support system 602 updates the customer support content database 612 by providing the reformed question with the answer received from the customer support personnel 606, to the customer support content database 612, according to one embodiment. In one embodiment, the question and answer customer support system 602 creates a first version of the question identified at operation 608, and creates a second (reformed) version of the original question that has been reformed at operation 626. The question and answer customer support system 602 associates the answer received from the customer support personnel 606 with the first version of the question (e.g., with the original question) and with the second version of the question (e.g., the reformed question) in the customer support content database 612, according to one embodiment. By maintaining two versions of the same question, the question and answer customer support system 602 is enabled to direct the question submitter 604 to the original question and its corresponding answer, while being enabled to publish the reformed question (e.g., improved-popularity question) to the public so that the reformed question is searchable and/or identifiable by one or more Internet search engines, according to one embodiment. In one embodiment, the customer question and answer customer support system 602 updates the customer support content database 612 by removing the original question or by replacing the original question with the reformed question and by associating the reformed question with the answer received from the customer support personnel 606. In one embodiment, a copy of each of the two (or multiple) versions of the question is stored with an independent copy of the answer in the customer support content database 612. Operation 634 proceeds to operation 636, according to one embodiment.

At operation 636, the question and answer customer support system 602 publishes the question and answer, according to one embodiment. The question and answer customer support system 602 publishes the question and the answer to make the original and/or reformed question and answer available to Internet users and search engines to find and review the question. The question and answer customer support system 602 publishes the question and answer by changing one or more characteristics of the question and/or the answer stored in the question in the customer support content database 612, to enable the public and to enable search engines to search for and locate the question and the answer within the question and answer customer support system 602, according to one embodiment. Operation 636 proceeds to operation 638, according to one embodiment.

At operation 638, the question and answer customer support system 602 directs the question submitter 604 to the question and answer, according to one embodiment. The question and answer customer support system 602 directs the question submitter 604 to the question and the answer associated with a question by transmitting a hyperlink, or other Internet and/or intranet reference to the customer support content database 612, according to one embodiment. Operation 638 proceeds to operation 640, according to one embodiment.

At operation 640, the question submitter 604 receives the answer to the question that was submitted by the question submitter 604, according to one embodiment, so that the question submitter 604 experiences the question responding service provided through the question and answer customer support system 602, according to one embodiment.

The disclosed method and system for increasing Internet traffic to a question and answer customer support system, provides for significant improvements to the technical fields of customer support, Internet marketing, search engines, software implementation, and user experience. In addition, using the disclosed method and system for increasing Internet traffic to a question and answer customer support system results in more efficient use of human and non-human resources, fewer processor cycles being utilized, reduced memory utilization, and less communications bandwidth being utilized to relay data to and from backend systems. These benefits can be achieved because the disclosed method can cause users to be less likely to request live customer support by increasing the search engine ranking/visibility/popularity of quality content so that fewer questions are submitted to the question and answer customer support system. As a result, implementing the disclosed method causes computing systems to be transformed into faster, more efficient, and more effective computing systems.

Although the process 600 is described in one particular sequence of operations, in alternative embodiments, the process 600 can be implemented using other orders of operations. For example, according to one embodiment, operation 622 to determine whether to modify the question can precede operation 620 to route the question to customer support personnel.

Figure 7:
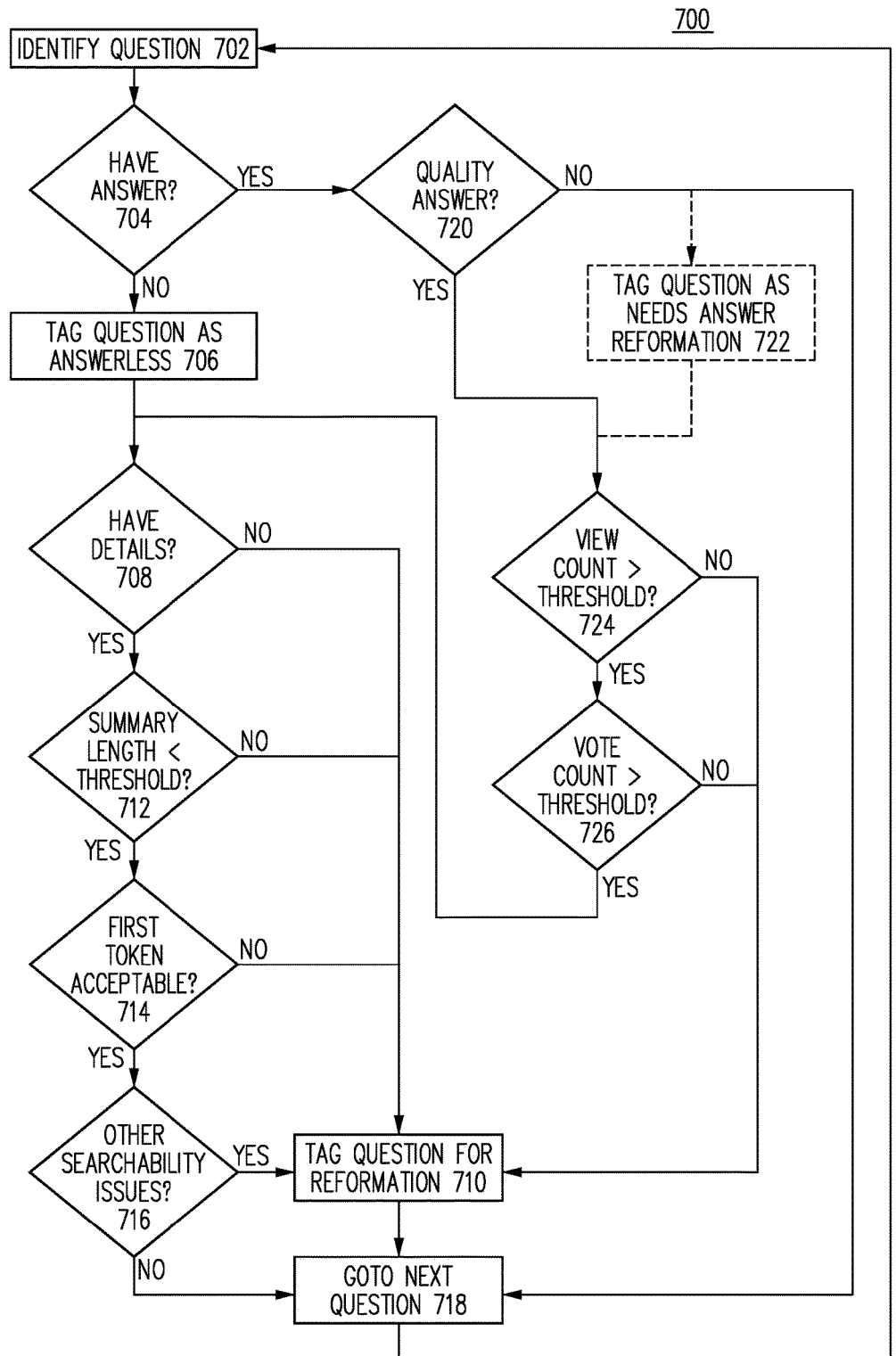
FIG. 7 is an illustrative example of a flow diagram representing one example of a generalized process for determining the searchability of a question, e.g., by a search engine.

FIG. 7 is a flow diagram representing one example of a process 700 for determining the searchability of a question, e.g., by a search engine, according to one embodiment. In one embodiment, the searchability of a question is determined in Boolean terms, e.g., yes, the question has an adequate searchability or no, the question does not have an adequate searchability. In one embodiment, the question and answer customer support system determines a non-Boolean or non-binary searchability score. When the searchability score exceeds or falls below a predetermined threshold, the question and answer customer support system routes the question to customer support personnel for reforming, according to one embodiment.

At operation 702, the process identifies a question, according to one embodiment. As discussed above, the process identifies questions as they are received from a question submitter (e.g., asking user), or identifies questions by iterating through one or more questions stored in a customer support system database, according to one embodiment. Operation 702 proceeds to operation 704, according to one embodiment.

At operation 704, the process determines if the question has an answer, according to one embodiment. In other words, the process determines if the question is being evaluated in real-time because the question was recently submitted by the question submitter, or if the question is originating from the customer support system database (e.g., non-real-time) to improve the content of the customer support system database, according to one embodiment. Answers that are coming directly from a user are not likely to have an answer associated with them, whereas questions that are coming from a database may or may not already have an answer associated therewith, according to one embodiment. If the question does not have an answer, operation 704 proceeds to operation 706, according to one embodiment. If the question has an answer, operation 704 proceeds to operation 720, according to one embodiment.

At operation 706, the process tags the question answerless, according to one embodiment. The process tags an answer by identifying the answer and/or marking the answer in the customer support system database as answerless, according to one embodiment. In one embodiment, the tagging or identifying of a question as answerless is one technique for creating a queue of answerless questions, according to one embodiment. In one embodiment the database is sorted by whether a question is associated with an answer and the answerless questions are copied to their own table or data structure for presentation to the customer support personnel. Operation 706 proceeds to operation 708, according to one embodiment.

At operation 708, the process determines if the question has details, according to one embodiment. As described above, whether or not a question has details is one of a number of determinative factors that can be used to estimate or predict whether a question is likely to result in a popular (e.g., highly viewed or viewed more than other posts) post. For example, whether or not a question has question details or includes details of information that describe the circumstances surrounding the question submitter's question, is a strong indicator of whether or not the question will be in the top 10% of all viewed posts or will receive more views than 90% of all posts hosted by the question and answer customer support system, according to one embodiment. Although top 10% of viewed posts is one standard for judging popularity, other percentages can be used (e.g., top 1%, top 5%, top 25%, upper 50%, etc.), according to various embodiments.

If the process, e.g., the question and answer customer support system, determines that the question does not have details the process proceeds to operation 710, according to one embodiment. If the question and answer customer support system determines that the question does have details, operation 708 proceeds to operation 712 according to one embodiment.

At operation 710, the process tags the question for reformation, according to one embodiment. Tagging, marking, and/or identifying the question for reformation includes identifying and/or marking the question within the customer support content database, according to one embodiment. In one embodiment, identifying and/or otherwise marking a question for reformation in the customer support content database is one technique used for generating a queue of questions that are tagged for reformation, according to one embodiment. The question and answer customer support system can then sort, rank, and/or distribute the tagged questions from the customer support content database to customer support personnel, to facilitate question reformation by the customer support personnel, according to one embodiment. In one embodiment, questions that are tagged as answerless and/or questions that are tagged for reformation are independently saved and/or maintained in one or more databases that are independent of published (e.g., publically available/searchable) databases so that the questions that are tagged for reformation do not show up in search engine search results. By preventing search engines from monitoring views and votes of questions that are tagged for reformation, the question and answer customer support system can protect its reputation with the search engines to reduce an automated de-emphasis or de-ranking of content, which may have historically been less popular. In one embodiment, questions that are tagged for reformation and/or that are tagged as answerless are routed and/or directed to customer support personnel for reforming and/or answering, according to one embodiment. The customer support personnel may reject the request to reform a question, at which time the question will remain tagged for reformation within the customer support content database, even if the customer support personnel answer the question. The questions that are tagged as answerless are untagged in response to receiving an answer for the question, in the customer support content database.

At operation 712, the process determines if the question summary length is less than a threshold (e.g., a question summary length threshold), according to one embodiment. Each question has a summary length, which provides the subject and/or an overview of what the question is about, and each question can include question details, in which a question submitter may provide additional details or described circumstances surrounding the question, according to one embodiment. Each question also includes a first token of the question summary, which is the first word in the question summary. The threshold for the summary length is a number of characters and/or a number of words, according to one embodiment. Shorter question summaries are generally more popular than longer question summaries because shorter summaries are more likely to have a stronger match with search criteria submitted to a search engine. By tagging questions having a question summary length that is longer than a threshold, the question and answer customer support system provides a customer support personnel with an opportunity to reform the question more concisely in order to improve the search engine popularity and/or visibility of a question. The question summary length of the question is a strong determining factor in whether or not a question becomes a highly viewed (e.g., popular) question. Therefore adjusting the summary length can improve the search engine searchability or the likelihood that a search engine will return and strongly rank the question to match search criteria received by users of the search engine, according to one embodiment. If the question summary length is greater than a threshold, operation 712 proceeds to operation 710 wherein the question is tagged for reformation, according to one embodiment. If the question summary length is less than the threshold, operation 712 proceeds to operation 714, according to one embodiment.

At operation 714, the process determines if the first token is acceptable, according to one embodiment. The first token is the first word of the question summary of the question, according to one embodiment. As described above in FIG. 5 and the corresponding discussion, some first tokens appear to correlate with more popular questions, while other first tokens correlate with less popular questions. In one embodiment, the process compares the first token of the question summary to a list of acceptable or a list of unacceptable first tokens to determine if the first token is acceptable. If the first token is unacceptable, operations 714 proceeds to operation 710 where the question is tagged for reformation, according to one embodiment. If the first token is acceptable, operation 714 proceeds to operation 716, according to one embodiment.

At operation 716 the process determines if other searchability issues exist for the question, according to one embodiment. Other searchability issues can include, but are not limited to, whether the question is ill-formed, whether the question is formatted in such a way that the likelihood of satisfaction of the user is low (e.g., a low quality question is likely to result in a low quality answer), according to one embodiment. If the process determines that there are other searchability issues, operation 716 proceeds to operation 710 where the question is tagged for reformation, according to one embodiment. If the process determines that other searchability issues do not exist, operation 716 proceeds to operation 718, according to one embodiment.

At operation 718, the process proceeds to a next question, according to one embodiment.

At operation 720, the process determines if the question has a quality answer, according to one embodiment. Questions that already have an answer are evaluated to determine or estimate potential benefit that may be derived from reforming the question, according to one embodiment. However, if the question and/or the answer are of low-quality (e.g., the question/answer is related to a product rather than a substantive issue), then the benefit received may not justify the use of resources for reforming the question. In one embodiment, quality of the answer is determined based on vote history for the answer. For example if the quantity or percentage of negative votes exceeds a threshold, e.g., a quality threshold, then the process determines that the answer is too low-quality to allocate resources to reforming the question, according to one embodiment. On the other hand, if the percentage or quantity of negative votes is below the threshold, then the process determines that the cost of reforming the question is worth the processing resources and human resources that are invested in reforming a question. If the process determines that the answer is not a quality answer, operation 720 proceeds to operation 718, according to one embodiment. If the process determines that the answer is a quality answer, operation 720 proceeds to operation 724, according to one embodiment. In an alternative embodiment, if the process determines that the answer is not a quality answer, the operation 720 may proceed to operation 722 to tag a question for answer reformation, to enable the answer to be reformed, prior to proceeding to operation 724, according to one embodiment.

At operation 724, the process determines if the view count is greater than a threshold, according to one embodiment. If the view count for the question is above a threshold (e.g., a view count threshold) then the question is deemed to be sufficiently popular, such that additional reformation may not provide additional benefit, according to one embodiment. If the view count of the question is below the threshold, then the question may be a good candidate to have customer support personnel reform the question to increase its popularity and therefore the likelihood of the question being well-ranked and well-matched to search criteria by a search engine, according to one embodiment. If the process determines that the view count does not exceed a threshold, operation 724 proceeds to operation 710, according to one embodiment. If the view count exceeds the threshold, operation 724 proceeds to operation 726, according to one embodiment.

At operation 726, the process determines if the vote count exceeds a threshold, according to one embodiment. If the vote count for a question exceeds a threshold, such as a predetermined vote count threshold, then the users who have reviewed the answer had determined that the quality of the question-answer pair is satisfactory, according to one embodiment. If the vote count is not greater than the threshold, then the question may be unsatisfactory, the answer may be unsatisfactory, and/or the question-answer pair may be unsatisfactory, according to one embodiment. If the vote count does not exceed the threshold (e.g., a vote count threshold), operation 726 proceeds to operation 710, according to one embodiment. If the vote count exceeds the threshold, operation 726 proceeds to operation 708 so that other attributes/searchability factors of the question can be analyzed by the process 700, according to one embodiment.

In one embodiment, as described above, the process 700 uses binary or Boolean decisions to determine whether or not to reform a question and/or answer. In other embodiment, each analysis of an attribute or characteristic of a question and/or answer can be associated with a score (e.g., an integer or floating point number). The sum of the scores can be used as a searchability score that is compared to a threshold to determine whether or not to tag a question and/or answer for reformation, according to one embodiment.

Figure 8:
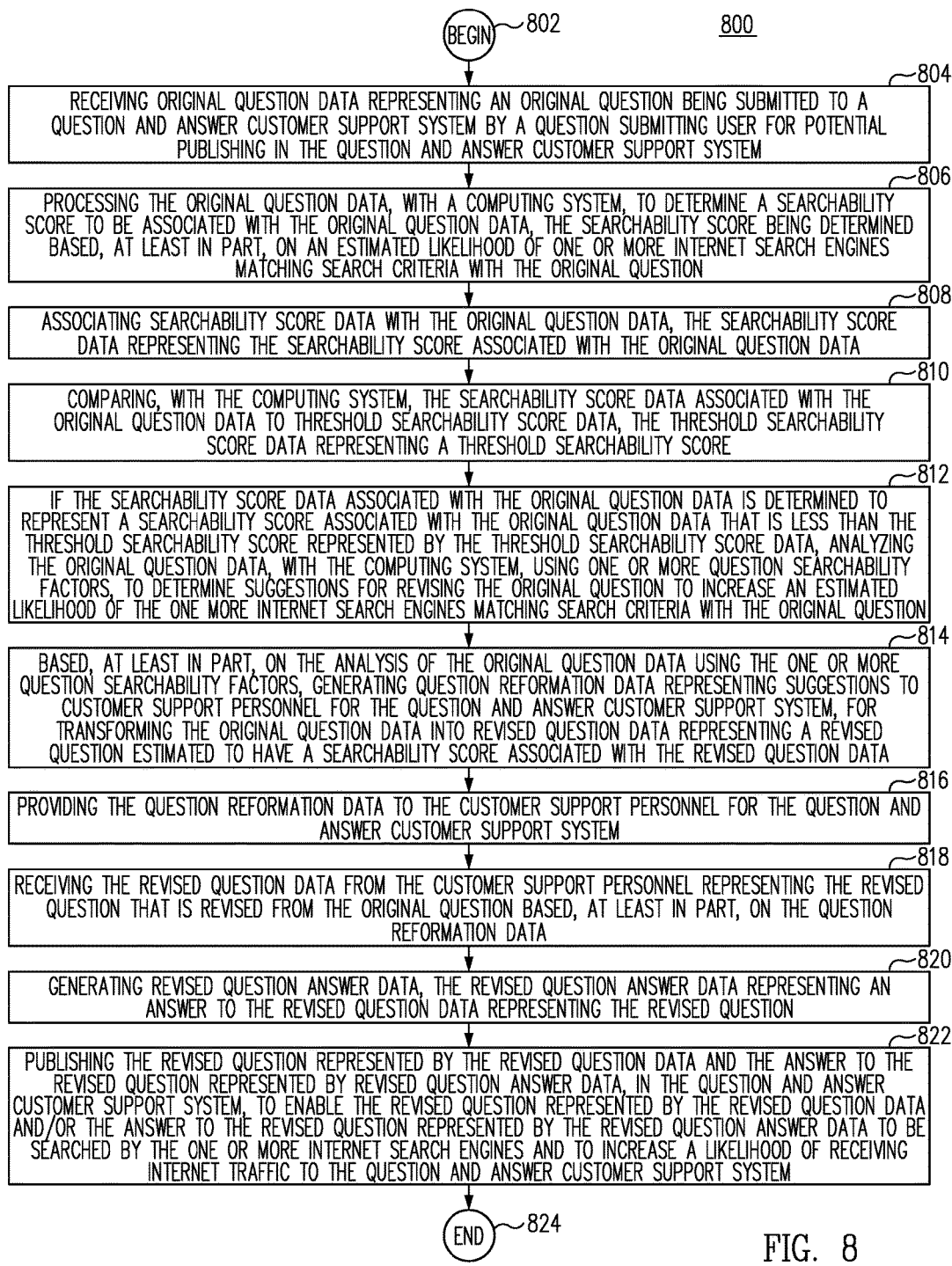
FIG. 8 is an illustrative example of a flow diagram representing one example of a generalized process for increasing Internet traffic to a question and answer customer support system.

FIG. 8 illustrates a flow diagram of an example of a process 800 for increasing Internet traffic to a question and answer customer support system, according to one embodiment.

At operation 802, the process begins.

At operation 804, the process includes receiving original question data representing an original question being submitted to a question and answer customer support system by a question submitting user for potential publishing in a question and answer customer support system, according to one embodiment. In one embodiment, the process receives an original question from a customer support content database, to improve the content of the database.

At operation 806, the process includes processing the original question data, with a computing system, to determine a searchability score to be associated with the original question data, the searchability score being determined based, at least in part, on an estimated likelihood of one or more Internet search engines matching search criteria with the original question, according to one embodiment. Prior to processing the original question, the process stores the original question data in a memory that is allocated to processing information for the question and answer customer support system, according to one embodiment. In one embodiment, processing the original question data is synonymous with analyzing the original question data. In one embodiment, operations performed on data (e.g., the original question data) in the process 800, the process 600, the process 700, and the process 900 are performed by one or more processors associated with the question and answer customer support system.

At operation 808, the process includes associating searchability score data with the original question data, the searchability score data representing the searchability score associated with the original question data, according to one embodiment.

At operation 810, the process includes comparing, with the computing system, the searchability score data associated with the original question data to threshold searchability score data, the threshold searchability score data representing a threshold searchability score, according to one embodiment.

At operation 812, the process includes, if the searchability score data associated with the original question data is determined to represent a searchability score associated with the original question data that is less than the threshold searchability score represented by the threshold searchability score data, analyzing the original question data, with the computing system, using one or more question searchability factors, to determine suggestions for revising the original question to increase an estimated likelihood of the one or more Internet search engines matching search criteria with the original question, according to one embodiment.

At operation 814, the process includes based, at least in part, on the analysis of the original question data using the one or more question searchability factors, generating question reformation data representing suggestions to customer support personnel for the question and answer customer support system, for transforming the original question data into revised question data representing a revised question estimated to have a searchability score associated with the revised question data, according to one embodiment.

At operation 816, the process includes providing the question reformation data to the customer support personnel for the question and answer customer support system, according to one embodiment.

At operation 818, the process includes receiving the revised question data from the customer support personnel representing the revised question that is revised from the original question based, at least in part, on the question reformation data, according to one embodiment.

At operation 820, the process includes generating revised question answer data, the revised question answer data representing an answer to the revised question data representing the revised question, according to one embodiment.

At operation 822, the process includes publishing the revised question represented by the revised question data and the answer to the revised question represented by revised question answer data, in the question and answer customer support system, to enable the revised question represented by the revised question data and/or the answer to the revised question represented by the revised question answer data to be searched by the one or more Internet search engines and to increase a likelihood of receiving Internet traffic to the question and answer customer support system, according to one embodiment.

At operation 824, the process ends, according to one embodiment.

Figure 9:
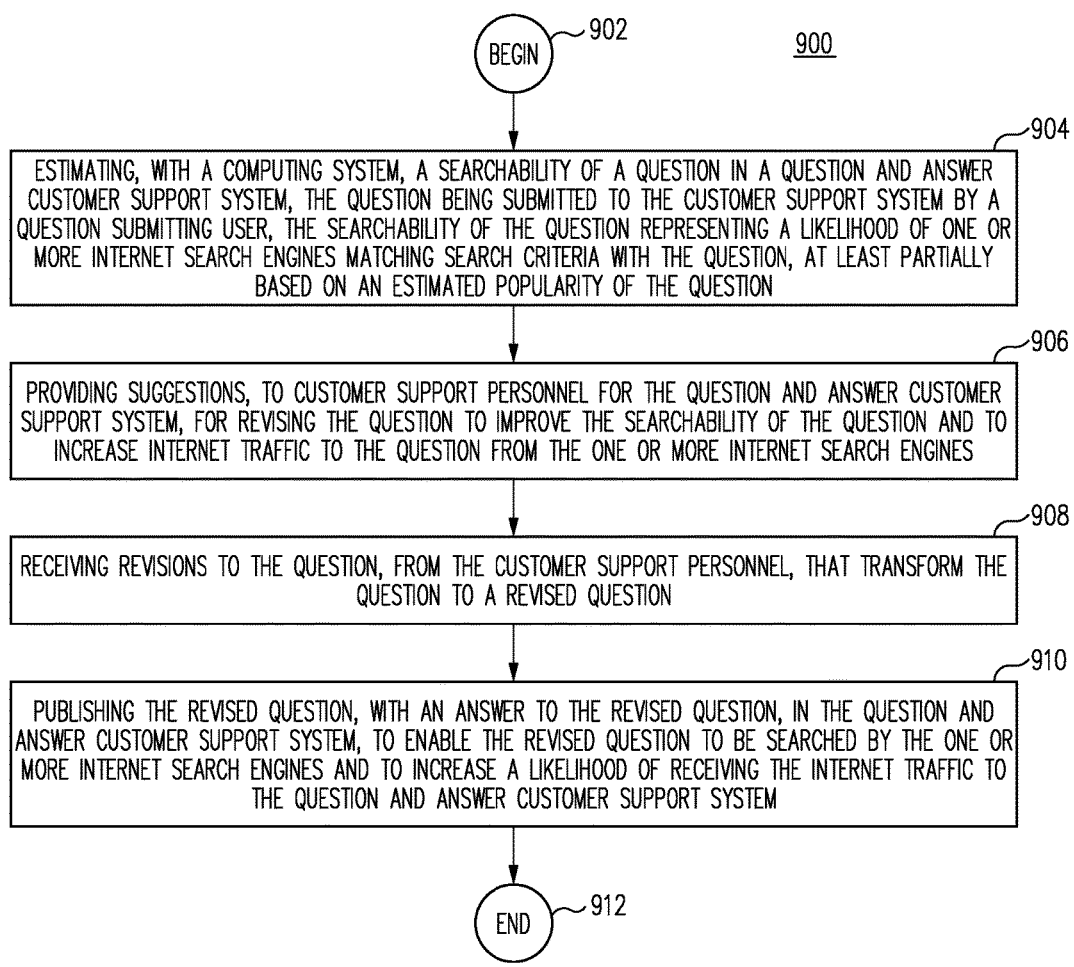
FIG. 9 is an illustrative example of a flow diagram representing one example of a generalized process for increasing Internet traffic to a question and answer customer support system.

FIG. 9 illustrates a flow diagram of an example of a process 900 for increasing Internet traffic to a question and answer customer support system, according to one embodiment.

At operation 902, the process begins, according to one embodiment.

At operation 904, the process includes estimating, with a computing system, a searchability of a question in a question and answer customer support system, the question being submitted to the customer support system by a question submitting user, the searchability of the question representing a likelihood of one or more Internet search engines matching search criteria with the question, at least partially based on an estimated popularity of the question, according to one embodiment.

At operation 906, the process includes providing suggestions, to customer support personnel for the question and answer customer support system, for revising the question to improve the searchability of the question and to increase Internet traffic to the question from the one or more Internet search engines, according to one embodiment.

At operation 908, the process includes receiving revisions to the question, from the customer support personnel, that transform the question to a revised question, according to one embodiment.

At operation 910, the process includes publishing the revised question, with an answer to the revised question, in the question and answer customer support system, to enable the revised question to be searched by the one or more Internet search engines and to increase a likelihood of receiving the Internet traffic to the question and answer customer support system, according to one embodiment.

At operation 912, the process ends, according to one embodiment.

User Experience

Figures 10A, 10B:
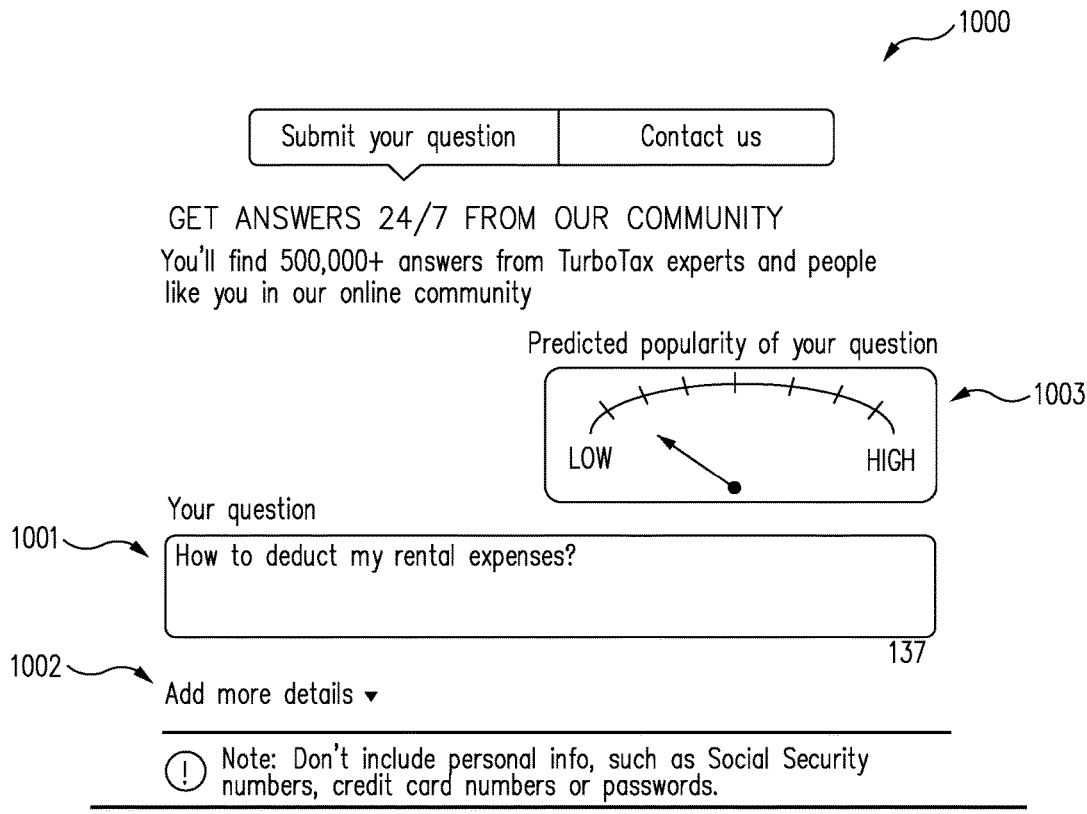
FIG. 10A is an illustrative example of an interface screen used to receive submission content from a user and that includes a question popularity indicator in accordance with one embodiment.
FIG. 10B is an illustrative example of an interface screen used to display search results of publicized submission content, i.e., posts, in accordance with one embodiment.

FIG. 10A illustrates an example of a user experience display 1000 for receiving questions from question submitters (i.e., asking users), and FIG. 10B illustrates an example of a user experience display 1010 for publishing or displaying questions received from question submitters, according to one embodiment.

The user experience display 1000 includes a question summary interface element 1001 and a question details interface element 1002, according to one embodiment. The question summary interface element 1001 provides an interface element wherewith the user enters a character-limited summary of the question, according to one embodiment. As discussed above, the shorter the question summary, the higher the likelihood that the question will be promoted, ranked, identified as relevant by a search engine, according to one embodiment. The question details interface element 1002 allows the user to provide a non-character-limited description of the question and/or the question submitters particular circumstances to give context to the question, according to one embodiment. The user experience display 1000 also includes a popularity indicator 1003 that provides a real-time predictive or estimated popularity analysis of the question as the question is entered by the question submitter, according to one embodiment. The popularity indicator 1003 may incentivize or encourage the user to adjust the question details and/or the question summary so that the question is more likely to be popular, according to one embodiment.

The user experience display 1010 displays a first question 1011 and a second question 1012, as the questions may appear to searching users or and/or customer support personnel who are reviewing the questions in the question and answer customer support system, according to one embodiment. The first question 1011 includes a question summary 1013 and question details 1014, according to one embodiment. The second question 1012 includes question summary 1015 and question details 1016, according to one embodiment. The process 600, 700, 800, and/or 900 are applied to each of the questions 1011 and 1012 (or more or fewer questions) in real-time, as the question submitter submits the questions or prepares the questions, so that the questions are tagged for question reformation.

Figure 11A:
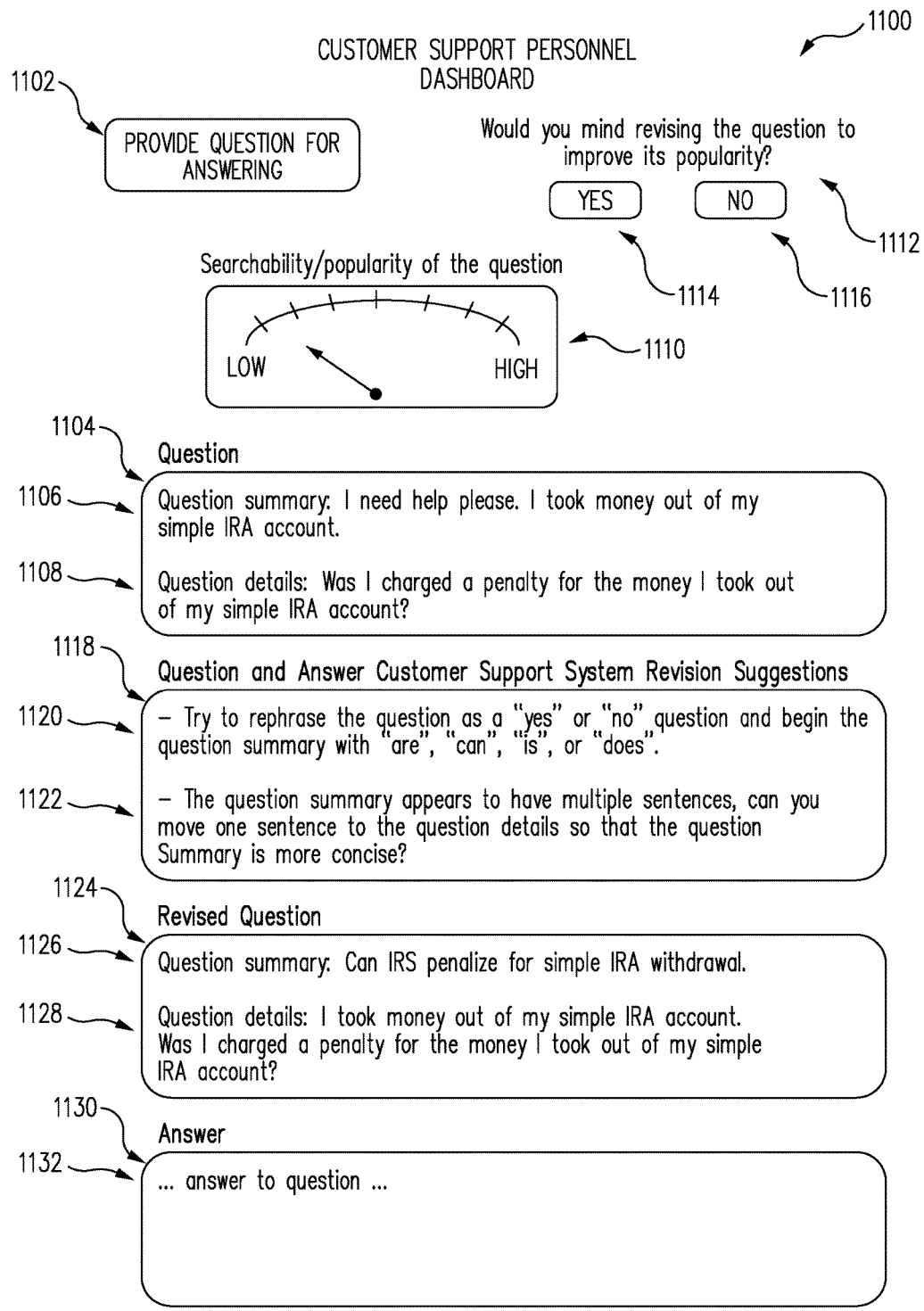
FIGS. 11A and 11B are illustrative examples of a customer support personnel dashboard useful for reforming and answering questions.
Figure 11B:
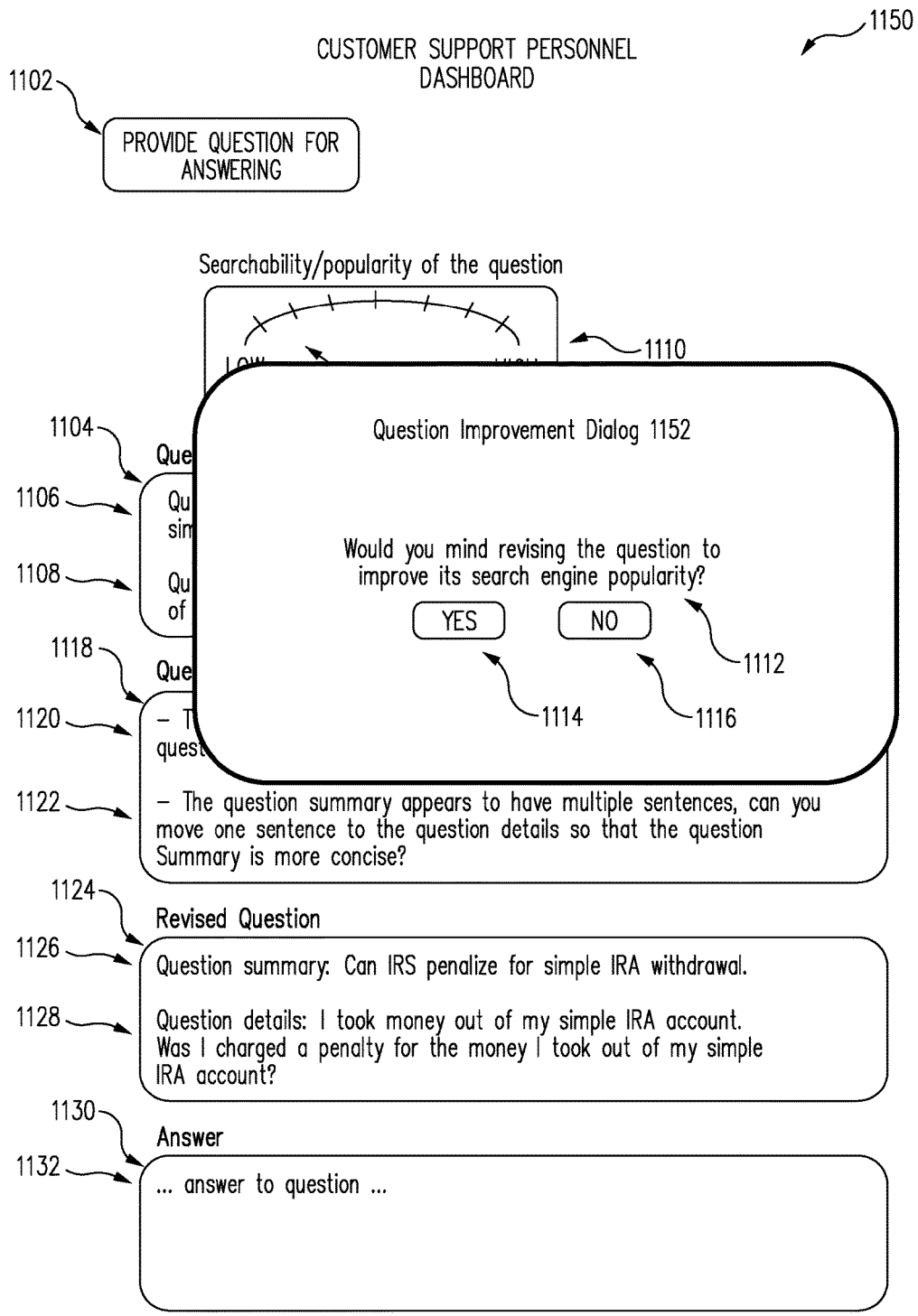

FIGS. 11A and 11B illustrate example embodiments of a customer support personnel dashboard 1100 and a customer support personnel dashboard 1150 for responding to questions submitted by question submitters.

The customer support personnel dashboard 1100 includes a button 1102 for retrieving a question for the customer support personnel to answer, according to one embodiment. Upon selection of the button 1102 by a customer support personnel, the question and answer customer support system populates a question interface element 1104 with a question for the customer support personnel to answer, according to one embodiment. The question displayed in the question interface element 1104 includes a question summary 1106 and question details 1108, according to one embodiment. The customer support personnel dashboard 1100 includes a popularity indicator 1110 that is configured to indicate to a customer support personnel a level or quantity of estimated popularity of a question, according to one embodiment. The question and answer customer support system estimates the popularity or search engine searchability of a question based on one or more question attributes and/or more searchability factors, as disclosed above, according to one embodiment.

The customer support personnel dashboard 1100 provides a request 1112 to ask the customer support personnel if he/she is willing to reform the question to improve the search engine visibility, and/or popularity of the question, according to one embodiment. The customer support personnel dashboard 1100 also provides a button 1114 to enable the customer support personnel to respond in the affirmative and provides a button 1116 to enable the customer support representative to respond in the negative, to the request to improve the search engine ranking of the question, according to one embodiment.

If the customer support personnel affirms a willingness to reform the question to improve the search engine ranking or searchability of the question, the customer support personnel dashboard 1100 populates a suggestions interface element 1118 with suggestions for the customer support personnel to improve and reform the question, according to one embodiment. The suggestions interface element 1118 includes a suggestion 1120 and a suggestion 1122, according to one embodiment. The suggestions interface element 1118 can include more or less than the suggestions 1120 and 1122, according to one embodiment. The suggestions can include, but are not limited to, recommended techniques for changing the first token of the question summary, techniques for decreasing the question summary length, suggestions for moving part of the question summary to the question details, rephrasing the question summary, and the like, according to various embodiments. The customer support personnel dashboard 1100 uses the popularity indicator 1110 to provide real-time feedback to the customer support personnel for changes made to the question, according to one embodiment.

The customer support personnel dashboard 1100 includes a revised question interface element 1124, which reflects revised question data received from the customer support personnel, according to one embodiment. The revised question interface element 1124 includes a reformed question summary 1126 and reformed question details 1128, which are representative reformed versions of the question summary 1106 and the question details 1108, according to one embodiment. The customer support personnel generates the reformed question summary 1126 and the reformed question details 1128, in response to the suggestions to improve the estimated popularity and/or searchability of the question, according to one embodiment.

The customer support personnel dashboard 1100 provides an answer interface element 1130 to enable the customer support personnel to generate an answer to the question, according to one embodiment. The answer interface element 1130 displays an answer 1132 that is received from the customer support personnel, as an answer to the revised question summary 1126 and the revised question details 1128, according to one embodiment. In one embodiment, the answer 1132 answers both the revised question and the original question, according to one embodiment.

The question of the customer support personnel dashboard 1150 includes a question improvement dialogue 1152 that is implemented as a pop-up window or dialog box to query the customer support personnel as to whether he/she is willing to improve and reform the question summary 1106 and/or the question details 1108, to improve the searchability and/or estimated popularity of the question, according to one embodiment.

Hardware Architecture

Figure 12:
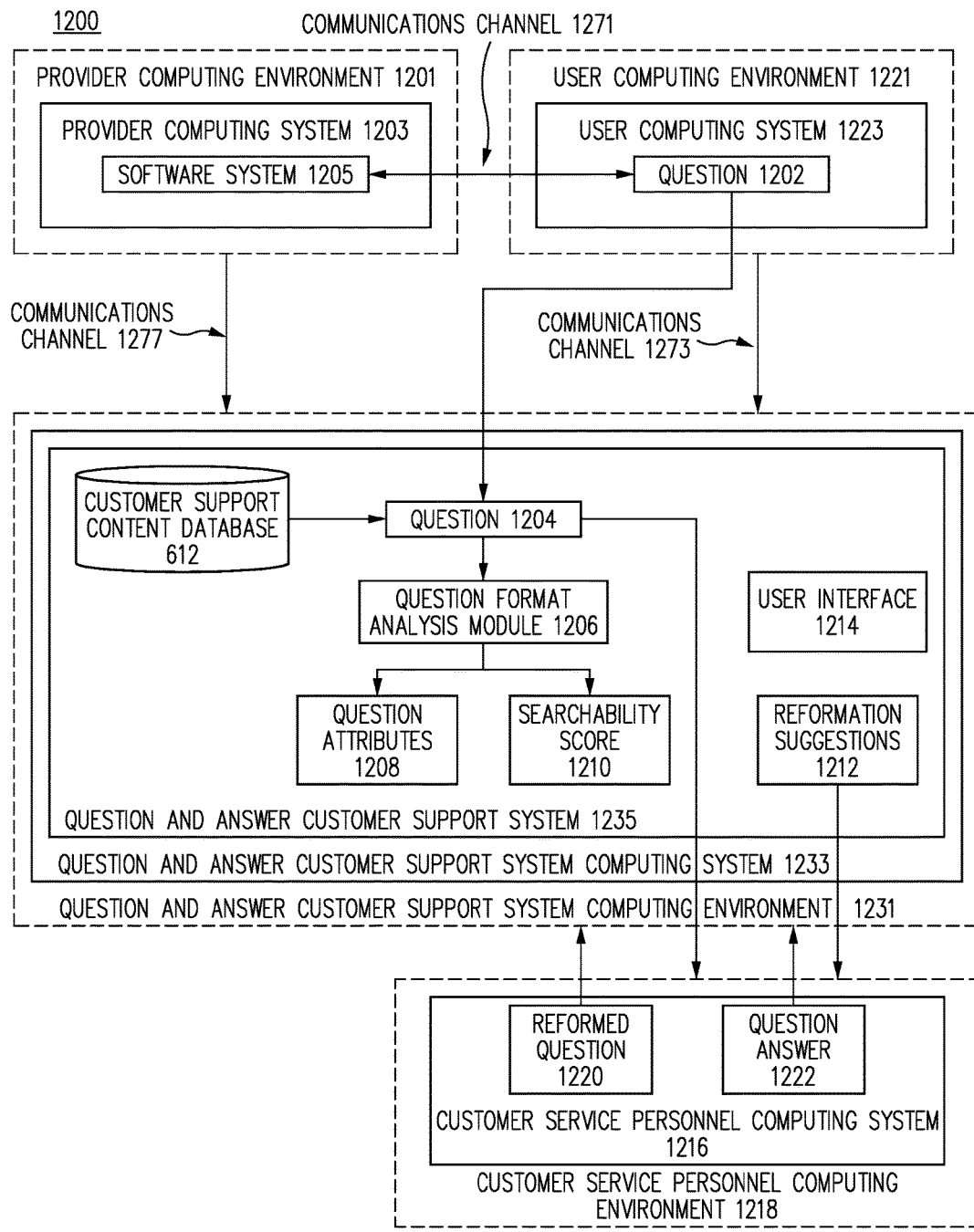
FIG. 12 is an illustrative example of a hardware architecture for increasing Internet traffic to a question and answer customer support system.

FIG. 12 is a block diagram of a hardware and production environment system 1200 for increasing Internet traffic to a question and answer customer support system, according to one embodiment.

As seen in FIG. 12, in one embodiment, a provider computing system 1203 is provided in provider computing environment 1201 and includes software system 1205. In various embodiments, software system 1205 is any software system discussed herein, known at the time of filing, and/or as developed after the time of filing.

As also seen in FIG. 12, user computing system 1223 is provided in user computing environment 1221. In one embodiment, a user of software system 1205 accesses provider computing system 1203 and software system 1205 via communications channel 1271.

In one embodiment, the users of software system 1205 are also provided a question and answer customer support system 1235 shown as implemented in question and answer customer support system computing system 1233 in question and answer customer support system computing environment 1231.

In one embodiment, through question and answer customer support system 1235, users can submit a question 1202 via communications channel 1273. The question 1202 represents a product related question, a subject matter (e.g., tax law) question, or some combination of a product related and a subject matter question, according to one embodiment. In one embodiment, the question 1202 is entered by the users and represents questions to potentially be provided to one or more support personnel associated with question and answer customer support system 1235. In one embodiment, the question 1202 is submitted by the users so that the questions represented by the question 1202 can potentially be answered and/or reformed by one or more customer support personnel.

In one embodiment, the software system 1205 provides user information, user data, and/or other context information related to the question 1202 to the question and answer customer support system 1235 through communications channel 1277.

The question and answer customer support system 1235 receives and analyzes the question 1202, to determine whether to route the question to customer support personnel for reformation, according to one embodiment. The question 1204 can be the question 1202 or a question received from the customer support content database 612, according to one embodiment. The question and answer customer support system 1235 employs a question format analysis module 1206 to analyze question attributes 1208 and to generate a searchability score 1210 (based at least partially on the question attributes 1208), according to one embodiment. The question and answer customer support system 1235 generates reformation suggestions 1212 and provides the reformation suggestions 1212 (e.g., through a user interface 1214) to a customer service personnel computing system 1216, which is within a customer service personnel computing environment 1218, according to one embodiment.

In response to receiving the question 1204 and the reformation suggestions 1212, the customer service personnel computing system 1216 provides a reformed question 1220 and/or a question answer 1222, to improve the popularity of quality questions, to increase Internet traffic to the question and answer customer support system 1235, according to one embodiment.

Various embodiments of processes and systems are described above. In one embodiment, implementation of one or more of the processes 600, 700, 800, and/or 900 (and/or variations thereof) are ordered combinations of a technologically rooted solution to an Internet-centric problem of increasing Internet traffic to questions, to question-answer pairs, and/or to a system that hosts questions and question-answer pairs.

In accordance with one embodiment, a computer-implemented method increases Internet traffic to a question and answer customer support system. The method includes receiving original question data representing an original question being submitted to a question and answer customer support system by a question submitting user for potential publishing in the question and answer customer support system, according to one embodiment. The method includes before publishing the original question in the question and answer customer support system: processing the original question data, with a computing system, to determine a searchability score to be associated with the original question data, the searchability score being determined based, at least in part, on an estimated likelihood of one or more Internet search engines matching search criteria with the original question, according to one embodiment. The method includes associating searchability score data with the original question data, the searchability score data representing the searchability score associated with the original question data, according to one embodiment. The method includes comparing, with the computing system, the searchability score data associated with the original question data to threshold searchability score data, the threshold searchability score data representing a threshold searchability score, according to one embodiment. The method includes, if the searchability score data associated with the original question data is determined to represent a searchability score associated with the original question data that is less than the threshold searchability score represented by the threshold searchability score data, analyzing the original question data, with the computing system, using one or more question searchability factors, to determine suggestions for revising the original question to increase an estimated likelihood of the one or more Internet search engines matching search criteria with the original question, according to one embodiment. The method includes based, at least in part, on the analysis of the original question data using the one or more question searchability factors, generating question reformation data representing suggestions to customer support personnel for the question and answer customer support system, for transforming the original question data into revised question data representing a revised question estimated to have a searchability score associated with the revised question data, according to one embodiment. The method includes providing the question reformation data to the customer support personnel for the question and answer customer support system, according to one embodiment. The method includes receiving the revised question data from the customer support personnel representing the revised question that is revised from the original question based, at least in part, on the question reformation data, according to one embodiment. The method includes generating revised question answer data, the revised question answer data representing an answer to the revised question data representing the revised question, according to one embodiment. The method includes publishing the revised question represented by the revised question data and the answer to the revised question represented by revised question answer data, in the question and answer customer support system, to enable the revised question represented by the revised question data and/or the answer to the revised question represented by the revised question answer data to be searched by the one or more Internet search engines and to increase a likelihood of receiving Internet traffic to the question and answer customer support system.

In accordance with an embodiment, a computer-implemented method increases Internet traffic to a question and answer customer support system. The method includes estimating, with a computing system, a searchability of a question in a question and answer customer support system, the question being submitted to the customer support system by a question submitting user, the searchability of the question representing a likelihood of one or more Internet search engines matching search criteria with the question, at least partially based on an estimated popularity of the question, according to one embodiment. The method includes providing suggestions, to customer support personnel for the question and answer customer support system, for revising the question to improve the searchability of the question and to increase Internet traffic to the question from the one or more Internet search engines, according to one embodiment. The method includes receiving revisions to the question, from the customer support personnel, that transform the question to a revised question, according to one embodiment. The method includes publishing the revised question, with an answer to the revised question, in the question and answer customer support system, to enable the revised question to be searched by the one or more Internet search engines and to increase a likelihood of receiving the Internet traffic to the question and answer customer support system, according to one embodiment.

In accordance with an embodiment, a computer-implemented method for increases Internet traffic to a question and answer customer support system. The method includes identifying, with a processor, original question data representing an original question received from a question submitting user with a question and answer customer support system, wherein the original question data representing the original question includes original question attribute data representing original question attributes for the original question, according to one embodiment. The method includes storing the original question data in memory allocated to processing information for the question and answer customer support system, according to one embodiment. The method includes determining, in the memory with the processor, an estimated level of popularity of the original question by analyzing the original question attribute data representing original question attributes for the original question, the estimated level of popularity for the original question being a factor in a level of relevance given to the original question in search results generated by an Internet search engine for search criteria received by the Internet search engine from an Internet user, according to one embodiment. The method includes, if the estimated level of popularity of the original question is below a question popularity threshold, requesting reformation question data, which represents a reformed question that is a reformed version of the original question, from customer support personnel, to cause an estimated level of popularity of the reformed question to be greater than the estimated level of popularity of the original question, according to one embodiment. The method includes, receiving the reformation data from the customer support personnel in response to requesting the reformation question data from the customer support personnel, according to one embodiment. The method includes, receiving answer data from the customer support personnel, which represents an answer to the reformed question, according to one embodiment. The method includes publishing the reformed question, with the answer to the reformed question, in a customer support content database for the question and answer customer support system, to enable the reformed question data to be searched by the one or more Internet search engines and to increase a likelihood of receiving the Internet traffic to the question and answer customer support system.

In accordance with an embodiment a system increases Internet traffic to a question and answer customer support system. The system includes at least one processor, and at least one memory coupled to the at least one processor, according to one embodiment. The at least one memory stores instructions which, when executed by any set of the one or more processors, perform a process for increasing Internet traffic to a question and answer customer support system, according to one embodiment. The process includes receiving original question data representing an original question being submitted to a question and answer customer support system by a question submitting user for potential publishing in the question and answer customer support system, according to one embodiment. The process includes, before publishing the original question in the question and answer customer support system: processing the original question data, with a computing system, to determine a searchability score to be associated with the original question data, the searchability score being determined based, at least in part, on an estimated likelihood of one or more Internet search engines matching search criteria with the original question, according to one embodiment. The process includes associating searchability score data with the original question data, the searchability score data representing the searchability score associated with the original question data, according to one embodiment. The process includes comparing, with the computing system, the searchability score data associated with the original question data to threshold searchability score data, the threshold searchability score data representing a threshold searchability score, according to one embodiment. The process includes, if the searchability score data associated with the original question data is determined to represent a searchability score associated with the original question data that is less than the threshold searchability score represented by the threshold searchability score data, analyzing the original question data, with the computing system, using one or more question searchability factors, to determine suggestions for revising the original question to increase an estimated likelihood of the one or more Internet search engines matching search criteria with the original question, according to one embodiment. The process includes based, at least in part, on the analysis of the original question data using the one or more question searchability factors, generating question reformation data representing suggestions to customer support personnel for the question and answer customer support system, for transforming the original question data into revised question data representing a revised question estimated to have a searchability score associated with the revised question data, according to one embodiment. The process includes providing the question reformation data to the customer support personnel for the question and answer customer support system, according to one embodiment. The process includes receiving the revised question data from the customer support personnel representing the revised question that is revised from the original question based, at least in part, on the question reformation data, according to one embodiment. The process includes generating revised question answer data, the revised question answer data representing an answer to the revised question data representing the revised question, according to one embodiment. The process includes publishing the revised question represented by the revised question data and the answer to the revised question represented by revised question answer data, in the question and answer customer support system, to enable the revised question represented by the revised question data and/or the answer to the revised question represented by the revised question answer data to be searched by the one or more Internet search engines and to increase a likelihood of receiving Internet traffic to the question and answer customer support system, according to one embodiment.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein, are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "accessing," "analyzing," "obtaining," "identifying," "associating," "aggregating," "initiating," "collecting," "creating," "transferring," "storing," "searching," "comparing," "providing," "processing" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes by a computer program stored via a computer program product as defined herein that can be accessed by a computing system or other device to transform the computing system or other device into a specifically and specially programmed computing system or other device.

Those of skill in the art will readily recognize that the algorithms and operations presented herein are not inherently related to any particular computing system, computer architecture, computer or industry standard, or any other specific apparatus. It may prove convenient/efficient to construct or transform one or more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS. are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:

1. A computer-implemented method for increasing Internet traffic to a question and answer customer support system, the method comprising:

receiving original question data representing an original question being submitted to a question and answer customer support system by a question submitting user for potential publishing in the question and answer customer support system;

storing the original question data in memory allocated to processing information for the question and answer customer support system;

analyzing the original question data, in the memory with a processor, to determine a searchability score to be associated with the original question data, the searchability score being determined by accumulating numerical assignments applied to attributes of the original question data;

comparing, with the processor, searchability score data associated with the original question data to threshold searchability score data, the threshold searchability score data representing a threshold searchability score;

upon a determination that the searchability score is less than the threshold searchability score represented by the threshold searchability score data, analyzing the original question data, with the processor, using one or more question searchability factors, to determine suggestions for reforming the original question to increase an estimated likelihood of the one or more Internet search engines matching search criteria with the original question, the suggestions including at least a suggestion to convert the original question from one type to another, with suggestions being selected from at least converting a why question type to a how type question type, transforming a why question type to a closed ended question type, and transforming a why question type to a what question type;

based, at least in part, on the analyzing the original question data using the one or more question searchability factors, generating question reformation data representing suggestions to customer support personnel for the question and answer customer support system, for transforming the original question data into reformed question data representing a reformed question estimated to have a searchability score associated with the reformed question data;

providing the question reformation data to the customer support personnel for the question and answer customer support system;

receiving the reformed question data from the customer support personnel representing the reformed question that is reformed from the original question based, at least in part, on the question reformation data;

generating reformed question answer data, the reformed question answer data representing an answer to the reformed question data representing the reformed question; and publishing the reformed question represented by the reformed question data, with the answer to the reformed question represented by reformed question answer data, in the question and answer customer support system, to enable the reformed question represented by the reformed question data and/or the answer to the reformed question represented by the reformed question answer data to be searched by the one or more Internet search engines and to increase a likelihood of receiving Internet traffic to the question and answer customer support system.

2. The computer-implemented method of claim 1, wherein the original question includes at least one of an original question summary and original question details, the original question summary representing a character-limited overview of the original question, wherein the reformed question includes at least one of a reformed question summary and reformed question details.

3. The computer-implemented method of claim 1, wherein the searchability score is binary and is one of a first searchability score and a second searchability score, the first searchability score being indicative of a positive likelihood of one or more Internet search engines matching search criteria with the original question, and the second searchability score being indicative of a negative likelihood of one or more Internet search engines matching search criteria with the original question.

4. The computer-implemented method of claim 1, wherein the searchability score includes one of two Boolean values that represent whether the one or more Internet search engines are likely to match the search criteria to the original question.

5. The computer-implemented method of claim 1, wherein the threshold searchability score is one of an integer number threshold, a floating point number threshold, and a binary number threshold.

6. The computer-implemented method of claim 1, wherein the searchability score data associated with the original question data is original searchability score data, the method further comprising:
 after receiving the reformed question data from the customer support personnel, processing the reformed question data to determine a reformed searchability score to be associated with the reformed question data, the reformed searchability score being determined based, at least in part, on an updated estimated likelihood of the one or more Internet search engines matching the search criteria with the reformed question that is represented by the reformed question data.

7. The computer-implemented method of claim 6, further comprising:
 representing, in a user experience display, the updated estimated likelihood of the one or more Internet search engines matching the search criteria with the reformed question that is represented by the reformed question data, to indicate to the customer support personnel an affect of the reformed question data.

8. The computer-implemented method of claim 1, wherein processing the original question includes:
 determining an estimated popularity of the original question, wherein the estimated popularity of the original question is based on a quantity of views that the original question is estimated to receive in comparison to a quantity of views other questions of the question and answer customer support system are estimated to receive.

9. The computer-implemented method of claim 8, wherein the estimated popularity of the original question is determined by:
 analyzing an original question summary length for the original question,
 determining whether the original question includes original question details, and
 evaluating a first token for the original question summary for the original question.

10. The computer-implemented method of claim 1, further comprising:
 determining a quality score of the original question, before publishing the original question in the question and answer customer support system;
 comparing the quality score of the original question to a question quality threshold; and
 if the quality score of the original question is less than the question quality threshold, using one or more question quality factors to determine the suggestions for reforming the original question.

11. The computer-implemented method of claim 1, wherein generating the reformed question answer data includes receiving the reformed question answer data from the customer support personnel for the reformed question.

12. The computer-implemented method of claim 1, further comprising:
 storing the original question as a first version of the original question;
 storing the reformed question as a second version of the original question; and
 associating the answer to the reformed question data with the first version of the original question and with the second version of the original question in a customer support content database.

13. The computer-implemented method of claim 12, further comprising:
 directing the question submitting user to the first version of the original question and the answer to the reformed question data that is associated with the first version of the original question; and
 blocking access to the first version of the original question for the one or more Internet search engines.

14. The computer-implemented method of claim 12, wherein the first version of the original question is maintained in a first queue in the question and answer customer support system, and the second version of the original question is maintained in a second queue in the question and answer customer support system, the first queue in the question and answer customer support system being different that the second queue of the question and answer customer support system.

15. The computer-implemented method of claim 1, wherein the suggestions, for reforming the original question to increase an estimated likelihood of the one or more Internet search engines matching search criteria with the original question, include suggestions for modifying one or more attributes of the original question, the attributes of the original question including:
 a character length of an original question summary of the original question;
 a character length of original question details of the original question; and
 a first token of the original question summary of the original question.

16. A system for increasing Internet traffic to a question and answer customer support system, the system comprising:

at least one processor; and at least one memory coupled to the at least one processor, the at least one memory having stored therein instructions which, when executed by any set of the at least one processors, perform a process for increasing Internet traffic to a question and answer customer support system, the process including:

receiving original question data representing an original question being submitted to a question and answer customer support system by a question submitting user for potential publishing in the question and answer customer support system;

storing the original question data in the at least one memory;

analyzing the original question data, in the at least one memory with the at least one processor, to determine a searchability score to be associated with the original question data, the searchability score being determined by accumulating numerical assignments applied to attributes of the original question data;

comparing, with the at least one processor, the searchability score data associated with the original question data to threshold searchability score data, the threshold searchability score data representing a threshold searchability score;

upon a determination that the searchability score is less than the threshold searchability score represented by the threshold searchability score data, analyzing the original question data, with the at least one processor, using one or more question searchability factors, to determine suggestions for reforming the original question to increase an estimated likelihood of the one or more Internet search engines matching search criteria with the original question, the suggestions including at least a suggestion to convert the original question from one type to another, with suggestions being selected from at least converting a why question type to a how type question type, transforming a why question type to a closed ended question type, and transforming a why question type to a what question type;

based, at least in part, on the analyzing the original question data using the one or more question searchability factors, generating question reformation data representing suggestions to customer support personnel for the question and answer customer support system, for transforming the original question data into reformed question data representing a reformed question estimated to have a searchability score associated with the reformed question data;

providing the question reformation data to the customer support personnel for the question and answer customer support system;

receiving the reformed question data from the customer support personnel representing the reformed question that is reformed from the original question based, at least in part, on the question reformation data;

generating reformed question answer data, the reformed question answer data representing an answer to the reformed question data representing the reformed question; and publishing the reformed question represented by the reformed question data and the answer to the reformed question represented by reformed question answer data, in the question and answer customer support system, to enable the reformed question represented by the reformed question data and/or the answer to the reformed question represented by the reformed question answer data to be searched by the one or more Internet search engines and to increase a likelihood of receiving Internet traffic to the question and answer customer support system.

17. The system of claim 16, wherein the original question includes at least one of an original question summary and original question details, the original question summary representing a character-limited overview of the original question, wherein the reformed question includes at least one of a reformed question summary and reformed question details.

18. The system of claim 16, wherein the searchability score is binary and is one of a first searchability score and a second searchability score, the first searchability score being indicative of a positive likelihood of one or more Internet search engines matching search criteria with the original question, and the second searchability score being indicative of a negative likelihood of one or more Internet search engines matching search criteria with the original question.

19. The system of claim 16, wherein the searchability score includes one of two Boolean values that represent whether the one or more Internet search engines are likely to match the search criteria to the original question.

20. The system of claim 16, wherein the threshold searchability score is one of an integer number threshold, a floating point number threshold, and a binary number threshold.

21. The system of claim 16, wherein the searchability score data associated with the original question data is original searchability score data, wherein the process further includes:

after receiving the reformed question data from the customer support personnel, processing the reformed question data to determine a reformed searchability score to be associated with the reformed question data, the reformed searchability score being determined based, at least in part, on an updated estimated likelihood of the one or more Internet search engines matching the search criteria with the reformed question that is represented by the reformed question data.

22. The system of claim 21, wherein the process further includes:

representing, in a user experience display, the updated estimated likelihood of the one or more Internet search engines matching the search criteria with the reformed question that is represented by the reformed question data, to indicate to the customer support personnel an affect of the reformed question data.

23. The system of claim 16, wherein processing the original question includes:

determining an estimated popularity of the original question, wherein the estimated popularity of the original question is based on a quantity of views that the original question is estimated to receive in comparison to a quantity of views other questions of the question and answer customer support system are estimated to receive.

24. The system of claim 23, wherein the estimated popularity of the original question is determined by:

analyzing an original question summary length for the original question, determining whether the original question includes original question details, and evaluating a first token for the original question summary for the original question.

25. The system of claim 16, wherein the process further includes:

determining a quality score of the original question, before publishing the original question in the question and answer customer support system;

comparing the quality score of the original question to a question quality threshold; and if the quality score of the original question is less than the question quality threshold, using one or more question quality factors to determine the suggestions for reforming the original question.

26. The system of claim 16, wherein generating the reformed question answer data includes receiving the reformed question answer data from the customer support personnel for the reformed question.

27. The system of claim 16, wherein the process further includes:

storing the original question as a first version of the original question;

storing the reformed question as a second version of the original question; and associating the answer to the reformed question data with the first version of the original question and with the second version of the original question in a customer support content database.

28. The system of claim 27, wherein the process further includes:

directing the question submitting user to the first version of the original question and the answer to the reformed question data that is associated with the first version of the original question; and blocking access to the first version of the original question for the one or more Internet search engines.

29. The system of claim 27, wherein the first version of the original question is maintained in a first queue in the question and answer customer support system, and the second version of the original question is maintained in a second queue in the question and answer customer support system, the first queue in the question and answer customer support system being different that the second queue of the question and answer customer support system.

30. The system of claim 16, wherein the suggestions, for reforming the original question to increase an estimated likelihood of the one or more Internet search engines matching search criteria with the original question, include suggestions for modifying one or more attributes of the original question, the attributes of the original question including:

a character length of an original question summary of the original question;

a character length of original question details of the original question; and a first token of the original question summary of the original question.

* * * * *